(12) United States Patent
Yousef

(10) Patent No.: US 7,099,409 B2
(45) Date of Patent: Aug. 29, 2006

(54) CHANNEL ESTIMATION AND/OR EQUALIZATION USING REPEATED ADAPTATION

(75) Inventor: Nabil R. Yousef, Foothill Ranch, CA (US)

(73) Assignee: Broadcom Corporation, Irvine, CA (US)

( * ) Notice: Subject to any disclaimer, the term of this patent is extended or adjusted under 35 U.S.C. 154(b) by 714 days.

(21) Appl. No.: 10/075,054

(22) Filed: Feb. 13, 2002

(65) Prior Publication Data

US 2003/0152170 A1 Aug. 14, 2003

(51) Int. Cl.
*H03D 1/00* (2006.01)
*H04L 27/06* (2006.01)

(52) U.S. Cl. ..................... 375/340; 375/316
(58) Field of Classification Search ................ 375/238, 375/239, 242, 256, 257, 286, 316, 353, 340, 375/233, 350, 224, 229, 232, 285, 346, 348; 455/130
See application file for complete search history.

(56) References Cited

U.S. PATENT DOCUMENTS 5,513,215 A * 4/1996 Marchetto et al. .......... 375/233
6,426,972 B1 * 7/2002 Endres et al. ............... 375/229
6,449,320 B1 * 9/2002 Lindoff ....................... 375/319
2002/0060827 A1 * 5/2002 Agazzi ........................ 359/161
2002/0159546 A1 * 10/2002 Fulghum et al. ............ 375/341

\* cited by examiner

*Primary Examiner*—Jean B. Corrielus
*Assistant Examiner*—Erin M. File
(74) *Attorney, Agent, or Firm*—Garlick Harrison & Markison; Shayne X. Short

(57) ABSTRACT

A novel approach of repeated adaptation is provided that can be applied to either one or both of channel estimation and/or equalization. From an incoming data packet that includes data and a training sequence, a modified data packet is generated that includes the data, the training sequence, and at least one additional copy of the training sequence. From the format of this modified data packet, the same training sequence can be used over and over again a desired number of times to perform channel estimation and subsequent calculation of equalizer tap coefficients. Alternatively, the same training sequence can be used over and over again a desired number of times to converge the equalizer coefficient taps directly without doing any preliminary channel estimation. Generally, either of these approaches can be characterized as a cyclic adaptation operation that provides improved performance without incurring any reduction in throughput of the communication channel.

61 Claims, 18 Drawing Sheets

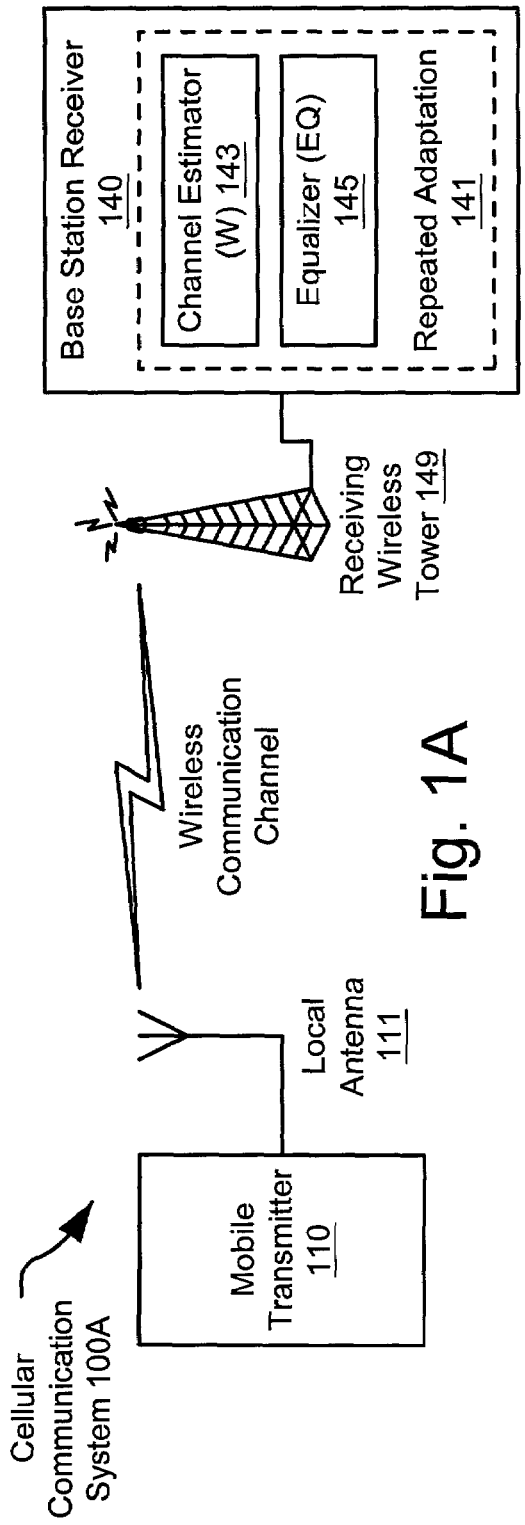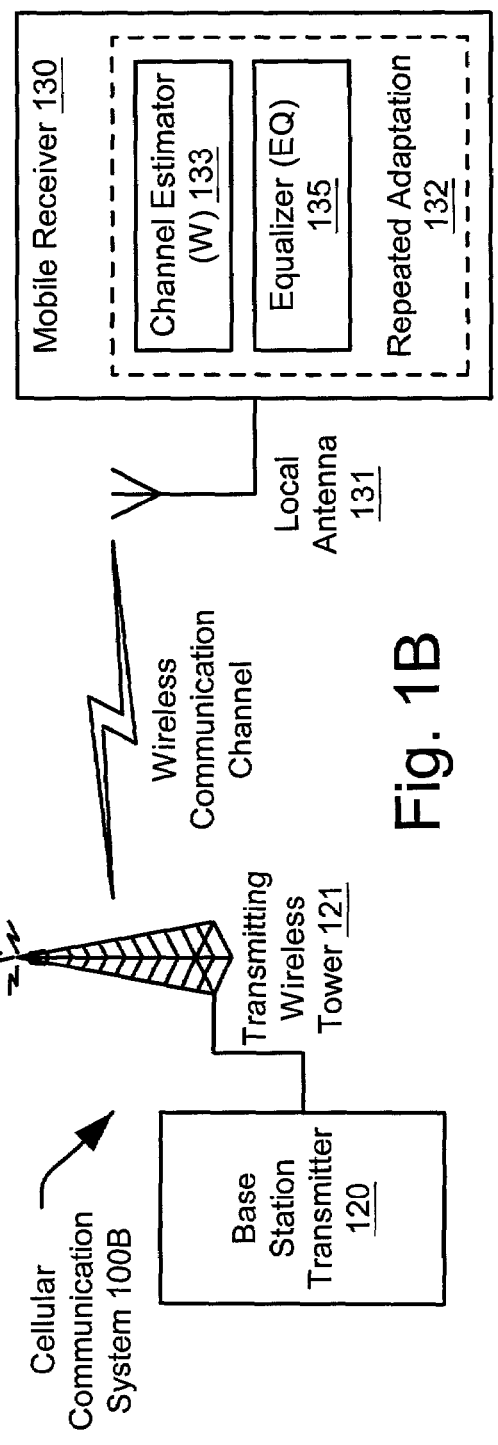

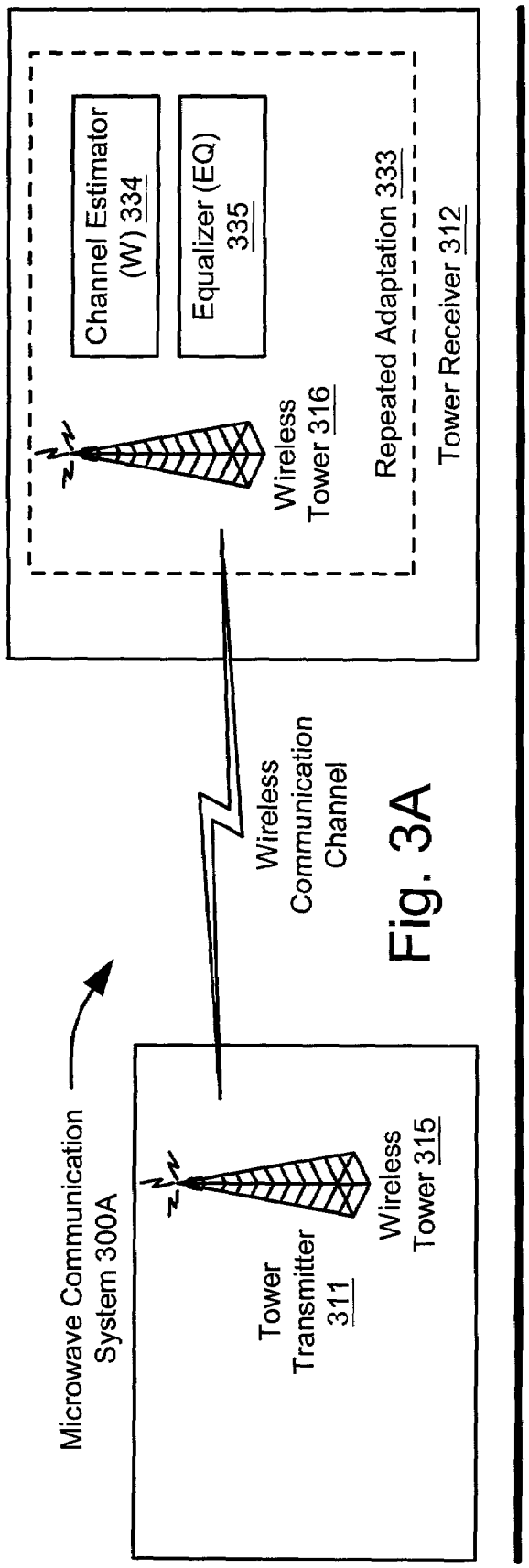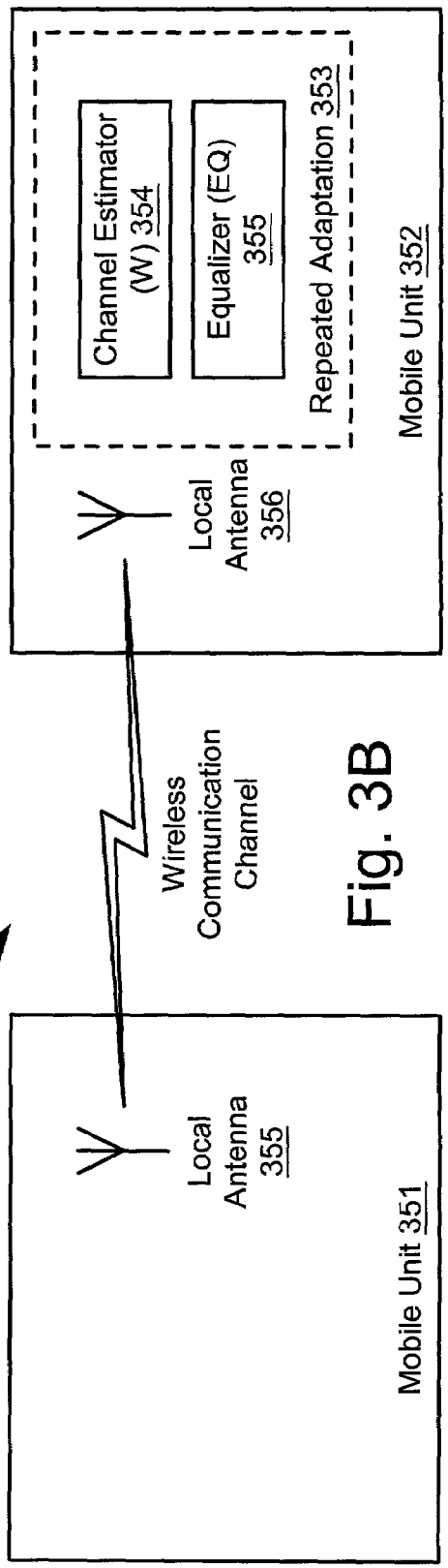

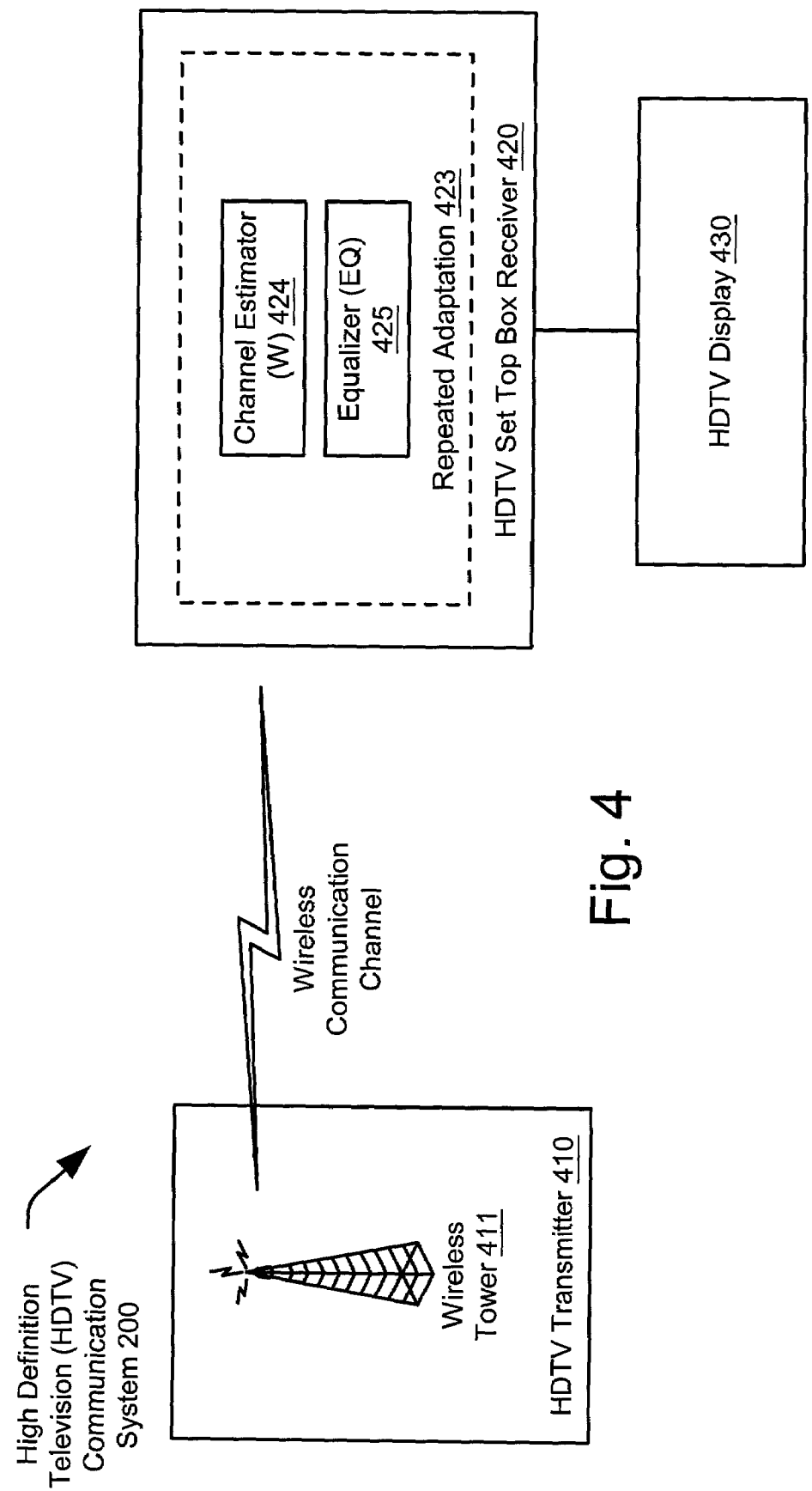

CHANNEL ESTIMATION AND/OR EQUALIZATION USING REPEATED ADAPTATION

BACKGROUND

1. Technical Field

The invention relates generally to communication systems; and, more particularly, it relates to signal processing within digital communication systems geared to compensate for channel induced deleterious effects.

2. Related Art

Signal processing within communication systems having a communication channel, in an effort to improve the quality of signals passing through the communication channel, have been under development for many years. In the past several years, emphasis has moved largely to the domain of digital communication systems that modulate bit streams into an analog signal for transmission over a communication channel. This channel can be a variety of channel types. Channel estimation, oftentimes performed to assist in calculating coefficients for equalizer taps to perform channel equalization, is a technique that is employed to try to minimize the deleterious effects that the communication channel may have on the transmitted data. For example, given a highly accurate estimate of the characteristics of the actual communication channel (achieved from channel estimation), then highly accurate channel equalization may be performed. This requires calculating a number of coefficients (the coefficients corresponding to the taps of the equalizer) to overcome the effects that the communication channel has on the received data. This attempts to try to generate a block that may be described as having a response that is the inverse of the channel response of the communication channel. Therefore, the data that are modulated and transmitted across the communication channel may be accurately recovered at the other end of the communication channel. The calculations required in performing channel estimation can prove to be quite computationally intensive using prior art approaches.

While there have been some approaches to try to address this problem in the prior art, they have been typically very computationally intensive. In some instance, a very large matrix is employed to try to describe the communication channel, and then this large matrix must then be inverted to try to equalize any channel effects that may undesirably affect a signal transmitted through it. This very intensive computation is typically employed within communication systems whose communication channels are static, or landline, where very little if no changes to the communication channel may occur. However, even within these systems, when changes do in fact occur, the communication system must typically characterize, or estimate the channel, and then try to equalize for any deleterious effects the communication channel may have on data that is transmitted through it. When the parameters of the communication channel change over time, the channel estimation and channel equalization must again be performed. When using prior art approaches, these processes are very computationally intensive, and the processing requirements of the system are typically very large. In the instance when the characteristics of the communication channel are changing over time, this can prove simply to be too burdensome for the system to accommodate. Most prior art approaches are simply unable to compensate for these rapidly changing effects within the communication channel.

Channel equalizers are essential building blocks of many communications systems. This is especially true in broadband applications where the inter-symbol-interference (ISI) is a critical problem that can significantly reduce the data throughput rate. In many such systems, the data are transmitted in packets. Each data packet usually will consist of a known training sequence followed by a portion of unknown data. The training sequence is usually employed to train the equalizer (by calculating the coefficients for the channel equalizer tap coefficients) to an optimal setting that is based on the communication channel's characteristics in its present state. Another approach employs the method described briefly above. In this situation, channel estimation is first employed to perform channel estimation on the communication channel between the transmitter and the receiver. This is typically performed by using the training sequence that is part of the transmitted data packet. After the channel estimation is performed, then the channel estimate is employed this estimate to compute the optimal equalizer tap coefficients to be able to compensate for any channel effects on transmitted data.

Further limitations and disadvantages of conventional and traditional systems will become apparent to one of skill in the art through comparison of such systems with the invention as set forth in the remainder of the present application with reference to the drawings.

SUMMARY OF THE INVENTION

Various aspects of the invention can be found in a communication system that performs channel estimation and/or channel equalization using repeated adaptation. The invention employs its repeated adaptation approach within the system identification mode and/or the channel equalization mode (which may be referred to as the "channel equalizer mode" as well without departing from the scope and spirit of the invention). In one embodiment, the repeated adaptation generates a very accurate estimate of the communication channel, and then direct computation of equalizer tap coefficients is performed to compute the optimal equalizer tap coefficients corresponding to the channel estimate. In another embodiment, the repeated adaptation is used to converge the equalizer tap coefficients directly without obtaining an estimate of the channel first. The present invention repeats the repeated adaptation on the same training sequence (TS) for multiple cycles. The resulting conditions, in either the channel equalization mode or the system identification mode, are used as the initial condition for the next cycle. If desired, 'a priori' information may be used to provide a more accurate initial condition; this may include offline channel modeling and/or characterization of the channel's response.

The present invention is able to use low complexity adaptive methods to converge with a relatively short training sequence. This is true in both the channel equalization and the system identification cases. From one perspective, the invention is based on "repeating" the adaptation for more than one cycle on the same training sequence. For example, at the beginning of every cycle the channel estimator or the equalizer tap coefficients (depending on the case being channel equalization or channel estimation/system identification) is/are initialized from their corresponding values at the end of the previous cycle. Furthermore, the initial condition of each cycle can be modified based on any 'a priori' information of the desired channel estimator/equalizer tap coefficients. This 'a priori' information may be achieved by using offline modeling techniques of the actual communication channel, by performing computer modeling of the expected characteristics of the communication channel, or any other approach. Such processes can speed up the convergence of the adaptive method and reduce the number of needed cycles for both the channel equalization (equalizer tap coefficient calculation) and the channel estimation approaches. By repeating this process, the low complexity repeated adaptation will converge to the desired solution much more quickly than within prior art approaches. Meanwhile, the incoming data may be "buffered," so that the same training sequence may be used over and over again within the repeated adaptation approach. The size of the needed buffer depends on the required number of cycles. The present invention provides for a relatively low complexity channel estimation and/or equalization solution.

It is also noted that the repeated adaptation of the present invention may be performed in a variety of contexts. Any communication channel may benefit from the repeated adaptation as performed in accordance with the present invention in a communication receiver. There are a variety of types of communication systems known in the art. Any such communication system that seeks to perform channel estimation and/or channel equalization (equalizer tap coefficient calculation) may employ the repeated adaptation techniques of the present invention.

In addition, borrowing on the repeated nature of the present invention, regions of cycles of the repeated adaptation may be further grouped together to achieve even better performance; this may be referred to as region-dependent error handling within the scope and spirit of repeated adaptation. For example, different number of iterations may be employed within the various regions; different step sizes may be used in the different regions. If desired, a threshold may or may not be used in the different regions to determine when the repeated adaptation is finished within that particular region; alternatively, a predetermined number of iterations may be performed in a region irrespective of the error remaining in the channel equalization (equalizer tap coefficient calculation) and/or channel estimation approach.

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

A better understanding of the invention can be obtained when the following detailed description of various exemplary embodiments is considered in conjunction with the following drawings.

FIG. 1A is a system diagram illustrating an embodiment of a cellular communication system that is built in accordance with certain aspects of the present invention.

FIG. 1B is a system diagram illustrating another embodiment of a cellular communication system that is built in accordance with certain aspects of the present invention.

FIG. 3A is a system diagram illustrating an embodiment of a microwave communication system that is built in accordance with certain aspects of the present invention.

FIG. 3B is a system diagram illustrating an embodiment of a point-to-point radio communication system that is built in accordance with certain aspects of the present invention.

FIG. 4 is a system diagram illustrating an embodiment of a high definition television (HDTV) communication system that is built in accordance with certain aspects of the present invention.

DETAILED DESCRIPTION OF THE INVENTION

Figure 2:
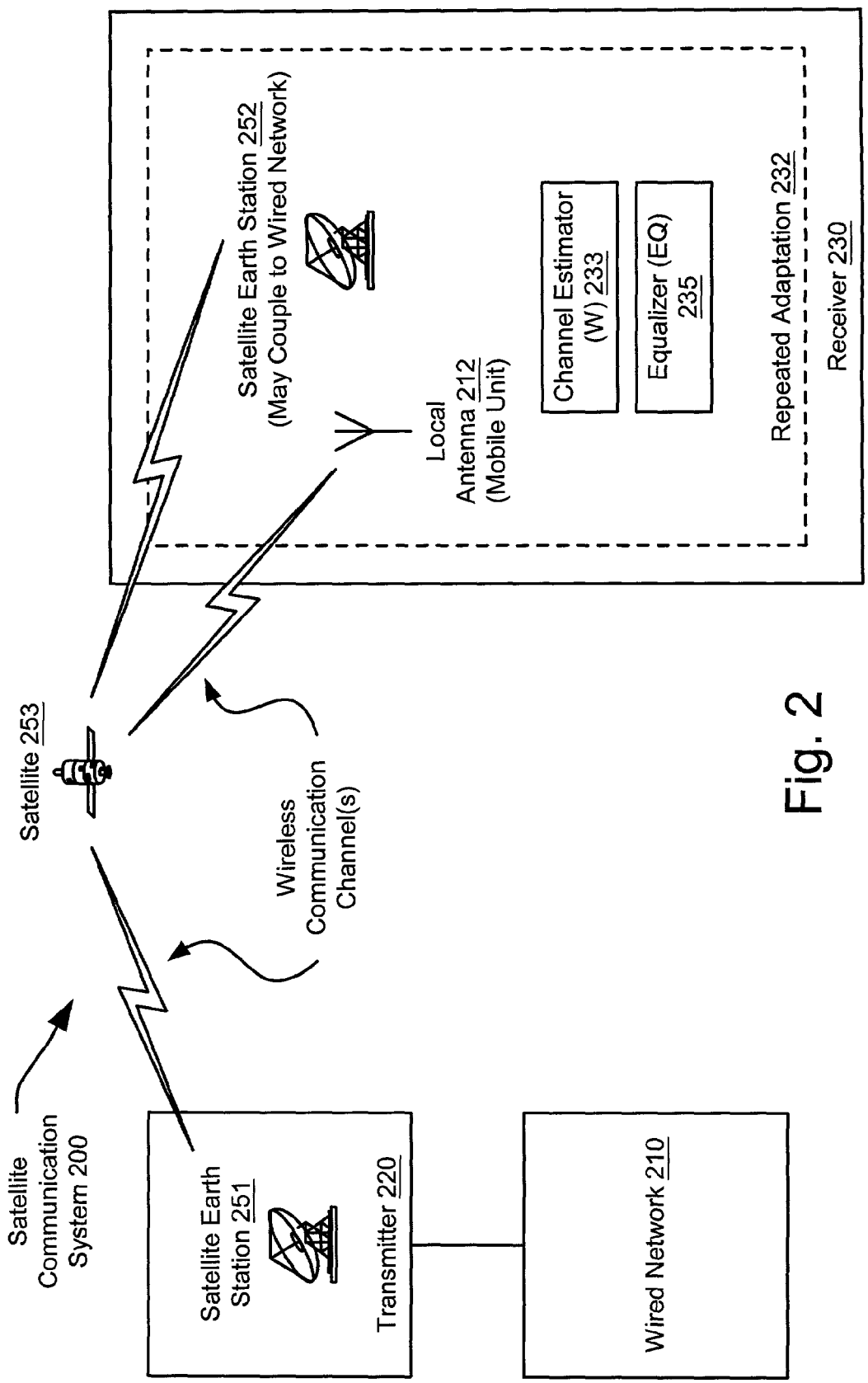
FIG. 2 is a system diagram illustrating an embodiment of a satellite communication of system that is built in accordance with certain aspects of the present invention.

The present invention is operable to perform channel estimation and/or equalization using repeated adaptation. The invention employs its repeated adaptation approach within the system identification mode and/or the channel equalization mode (channel equalizer tap coefficient calculation). In one embodiment, the repeated adaptation generates a very accurate estimate of the communication channel, and then direct tap computation of the channel equalizer tap coefficients is performed to compute the optimal equalizer tap coefficients corresponding to the channel estimate. In another embodiment, the repeated adaptation is used to converge the equalizer tap coefficients directly without obtaining an estimate of the channel first. The present invention repeats the repeated adaptation on the same training sequence for multiple cycles. The resulting conditions, in either the channel equalization mode or the channel estimation/system identification mode, are used as the initial condition for the next cycle. If desired, 'a priori' information may be used to provide a more accurate initial condition; this may include offline channel modeling and/or characterization of the communication channel and its response.

The present invention is able to use low complexity adaptive methods to converge with a relatively short training sequence. This is true in both the channel equalization and the channel estimation/system identification cases. From one perspective, the invention is based on "repeating" the adaptation for more than one cycle on the same training sequence. For example, at the beginning of every cycle the channel estimator or the equalizer tap coefficients (depending on the case being channel equalization or channel estimation/system identification) is/are initialized from their corresponding values at the end of the previous cycle. Furthermore, the initial condition of each cycle can be modified based on any 'a priori' information of the desired channel estimator/equalizer tap coefficients. This 'a priori' information may be achieved by using offline modeling techniques of the actual communication channel, by performing computer modeling of the expected characteristics of the communication channel, or any other approach. Such processes can speed up the convergence of the adaptive method and reduce the number of needed cycles for both the channel equalization (equalizer tap coefficient calculation) and the channel estimation approaches. By repeating this process, the low complexity repeated adaptation will converge to the desired solution much more quickly than within prior art approaches. Meanwhile, the incoming data may be "buffered," so that the same training sequence may be used over and over again within the repeated adaptation approach. The size of the needed buffer depends on the required number of cycles. The size of this buffer may be appropriately chosen for different applications. The present invention provides for a relatively low complexity channel estimation and/or equalization solution.

It is also noted that the repeated adaptation of the present invention may be performed in a variety of contexts, some of which are described below. However, any communication channel may benefit from the repeated adaptation as performed in accordance with the present invention in a communication receiver. There are a variety of types of communication systems known in the art. Any such communication system that seeks to perform channel estimation and/or channel equalization may employ the repeated adaptation techniques of the present invention.

There are many parameters that can govern the effectiveness of channel equalization. One critical factor in the success of such equalization schemes is whether or not the length of the training sequence, of the transmitted data packet, is in fact long enough for the channel estimator or the channel equalizer to converge during its calculation processes. If an adaptive method is used to converge the channel estimator/equalizer tap coefficients, then a relatively long training sequence is needed. In many prior art cases, the training sequence length is simply too short to converge using an adaptive method. On the other hand, a relatively short training sequence can be used with the corresponding received sequence to solve a set of equations that lead to the desired channel estimator and/or equalizer tap coefficients. The latter approach however requires a much higher complexity than that needed to converge an adaptive method. This higher complexity is usually in the form of the need for a huge number of multipliers and/or memory elements. As also described above, the channel estimation process and/or channel equalization process can be quite computationally intensive. However, the present invention provides a way to calculate a channel estimate or coefficients for the taps of a channel equalizer using repeated adaptation. The present invention is very computationally efficient when compared to prior art schemes.

FIG. 1A is a system diagram illustrating an embodiment of a cellular communication system 100A that is built in accordance with certain aspects of the present invention. A mobile transmitter 110 has a local antenna 111. The mobile transmitter 110 may be any number of types of transmitters including a cellular telephone, a wireless pager unit, a mobile computer having 115 transmit functionality, or any other type of mobile transmitter. The mobile transmitter 110 transmits a signal, using its local antenna 111, to a base station receiver 140 via a wireless communication channel. The base station receiver 140 is communicatively coupled to a receiving wireless tower 149 to be able to receive transmission from the local antenna 111 of the mobile transmitter 110 that have been communicated via the wireless communication channel. The receiving wireless tower 149 communicatively couples the received signal to the base station receiver 140.

The base station receiver 140 is then able to perform repeated adaptation, as shown in a functional block 141, on the received signal. The repeated adaptation 141 may be performed during channel equalization (equalizer tap coefficient calculation) and/or channel estimation, as shown within the channel estimator (W) 143 and the equalizer (EQ) 145. The FIG. 1A shows just one of many embodiments where the repeated adaptation, performed in accordance with the present invention, may be performed to provide for improved and faster converging channel estimation and/or channel equalization (equalizer tap coefficient calculation). In addition, in some embodiment of the cellular communication system 100A, the repeated adaptation 141 generates a very accurate estimate of the wireless communication channel (using the channel estimator (W) 143), and then direct tap computation is performed to compute the optimal equalizer tap coefficients corresponding to the channel estimate (the equalizer tap coefficients being calculated using the EQ 145). In another embodiment, the repeated adaptation is used to perform calculations to converge the equalizer tap coefficients directly without obtaining an estimate of the channel first (the equalizer tap coefficients being converged using the repeated adaptation 141 within the EQ 145). The present invention is able to accommodate, rather quickly, any dynamic channel characteristics of the wireless communication channel.

FIG. 1B is a system diagram illustrating another embodiment of a cellular communication system 100B that is built in accordance with certain aspects of the present invention. From certain perspectives, the FIG. 1B may be viewed as being the reverse transmission operation of the cellular communication system 100A of the FIG. 1A. A base station transmitter 120 is communicatively coupled to a transmitting wireless tower 121. The base station transmitter 120, using its transmitting wireless tower 121, transmits a signal to a local antenna 131 via a wireless communication channel. The local antenna 131 is communicatively coupled to a mobile receiver 130 so that the mobile receiver 130 is able to receive transmission from the transmitting wireless tower 121 of the base station transmitter 120 that have been communicated via the wireless communication channel. The local antenna 131 communicatively couples the received signal to the mobile receiver 130. It is noted that the mobile receiver 130 may be any number of types of transmitters including a cellular telephone, a wireless pager unit, a mobile computer having transmit functionality, or any other type of mobile transmitter.

The mobile receiver 130 is then able to perform repeated adaptation, as shown in a functional block 132, on the received signal. The repeated adaptation 132 may be performed during channel equalization (equalizer tap coefficient calculation) and/or channel estimation, as shown within the channel estimator (W) 133 and the EQ 135. The FIG. 1B shows just one of many embodiments where the repeated adaptation, performed in accordance with the present invention, may be performed to provide for improved and faster converging channel estimation and/or channel equalization (equalizer tap coefficient calculation). In addition, in some embodiment of the cellular communication system 100B, the repeated adaptation 132 generates a very accurate estimate of the wireless communication channel (using the channel estimator (W) 133), and then direct tap coefficient calculation is performed to compute the optimal equalizer tap coefficients corresponding to the channel estimate (the equalizer tap coefficients being calculated using the EQ 135). In another embodiment, the repeated adaptation is used to converge the equalizer tap coefficients directly without obtaining an estimate of the channel first (the equalizer tap coefficients being converged using the repeated adaptation 132 within the EQ 135). The present invention is able to accommodate, rather quickly, any dynamic channel characteristics of the wireless communication channel.

FIG. 2 is a system diagram illustrating an embodiment of a satellite communication system 200 that is built in accordance with certain aspects of the present invention. A transmitter 220 is communicatively coupled to a wired network 210. The wired network 210 may include any number of network including the Internet, proprietary networks, and other wired networks as understood by those persons having skill in the art. The transmitter 220 includes a satellite earth station 251 that is able to communicate to a satellite 253 via a wireless communication channel. The satellite 253 is able to communicate with a receiver 230. The receiver is also located on the earth. Here, the communication to and from the satellite 253 may cooperatively be viewed as being a wireless communication channel, or each of the communication to and from the satellite 253 may be viewed as being two distinct wireless communication channels.

For example, the wireless communication "channel" may be viewed as not including multiple wireless hops in one embodiment. In other embodiments, the satellite 253 receives a signal received from the satellite earth station 251, amplifies it, and relays it to the receiver 230; the receiver 230 includes terrestrial receivers such as satellite receivers, satellite based telephones, and satellite based Internet receivers. In the case where the satellite 253 receives a signal received from the satellite earth station 251, amplifies it, and relays it, the satellite 253 may be viewed as being a "transponders." In addition, other satellites may exist that perform both receiver and transmitter operations. In this case, each leg of an up-down transmission via the wireless communication channel would be considered separately. The wireless communication channel between the satellite 253 and a fixed earth station would likely be less time-varying than the wireless communication channel between the satellite 253 and a mobile station.

In whichever embodiment, the satellite 253 communicates with the receiver 230. The receiver 230 may be viewed as being a mobile unit in certain embodiments (employing a local antenna 212), or alternatively the receiver 230 may be viewed as being a satellite earth station 252 that may be communicatively coupled to a wired network in a similar manner that the satellite earth station 251, within the transmitter 220, communicatively couples to the wired network 210. In both situation, the receiver 230 is able to perform repeated adaptation in accordance with the present invention.

For example, the receiver 230 is able to perform repeated adaptation, as shown in a functional block 232, on the signal received from the satellite 253. The repeated adaptation 232 may be performed during channel equalization (equalizer tap coefficient calculation) and/or channel estimation, as shown within the channel estimator (W) 233 and the EQ 235. The FIG. 2 shows just one of many embodiments where the repeated adaptation, performed in accordance with the present invention, may be performed to provide for improved and faster converging channel estimation and/or channel equalization (equalizer tap coefficient calculation). In addition, in some embodiment of the satellite communication system 200, the repeated adaptation 232 generates a very accurate estimate of the wireless communication channel (using the channel estimator (W) 233), and then direct tap coefficient calculation is performed to compute the optimal equalizer tap coefficients corresponding to the channel estimate (the equalizer tap coefficients being calculated using the EQ 235). In another embodiment, the repeated adaptation is used to converge the equalizer tap coefficients directly without obtaining an estimate of the channel first (the equalizer tap coefficients being converged using the repeated adaptation 232 within the EQ 235). Again, the repeated adaptation 232 is able to accommodate, much quicker than prior art approaches, any dynamic channel characteristics of the wireless communication channel.

FIG. 3A is a system diagram illustrating an embodiment of a microwave communication system 300A that is built in accordance with certain aspects of the present invention. A tower transmitter 311 includes a wireless tower 315. The tower transmitter 310, using its wireless tower 315, transmits a signal to a tower receiver 312 via a wireless communication channel. The tower receiver 312 includes a wireless tower 316. The wireless tower 316 is able to receive transmissions from the wireless tower 315 that have been communicated via the wireless communication channel.

The tower receiver 312 is then able to perform repeated adaptation, as shown in a functional block 333, on the received signal. The repeated adaptation 333 may be performed during channel equalization and/or channel estimation, as shown within the channel estimator (W) 334 and the EQ 335. The FIG. 3 shows just one of many embodiments where the repeated adaptation, performed in accordance with the present invention, may be performed to provide for improved and faster converging channel estimation and/or channel equalization. In addition, in some embodiment of the microwave communication system 300A, the repeated adaptation 333 generates a very accurate estimate of the wireless communication channel (using the channel estimator (W) 334), and then direct tap computation is performed to compute the optimal equalizer tap coefficients corresponding to the channel estimate (the equalizer tap coefficients being calculated using the EQ 335). In another embodiment, the repeated adaptation is used to converge the equalizer tap coefficients directly without obtaining an estimate of the channel first (the equalizer tap coefficients being converged using the repeated adaptation 333 within the EQ 335). The present invention is able to accommodate, rather quickly, any dynamic channel characteristics of the wireless communication channel.

FIG. 3B is a system diagram illustrating an embodiment of a point-to-point radio communication system 300B that is built in accordance with certain aspects of the present invention. A mobile unit 351 includes a local antenna 355. The mobile unit 351, using its local antenna 355, transmits a signal to a local antenna 356 via a wireless communication channel. The local antenna 356 is included within a mobile unit 352. The mobile unit 352 is able to receive transmissions from the mobile unit 351 that have been communicated via the wireless communication channel.

Figure 5:
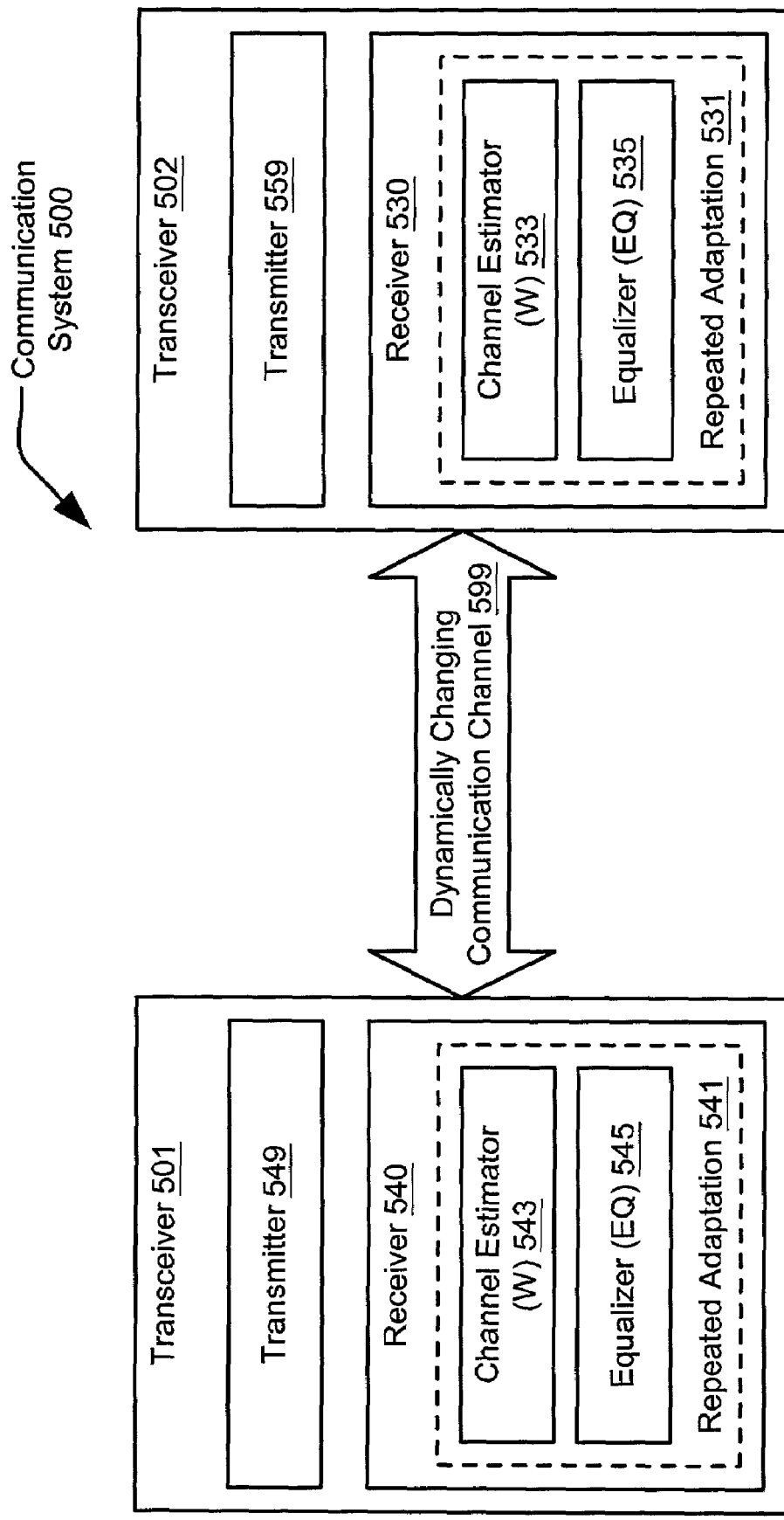
FIG. 5 is a system diagram illustrating an embodiment of a communication system that is built in accordance with certain aspects of the present invention.

The mobile unit 352 is then able to perform repeated adaptation, as shown in a functional block 353, on the received signal. The repeated adaptation 353 may be performed during channel equalization and/or channel estimation, as shown within the channel estimator (W) 354 and the EQ 355. The FIG. 5 shows just one of many embodiments where the repeated adaptation, performed in accordance with the present invention, may be performed to provide for improved and faster converging channel estimation and/or channel equalization. In addition, in some embodiment of the point-to-point radio communication system 300B, the repeated adaptation 353 generates a very accurate estimate of the wireless communication channel (using the channel estimator (W) 354), and then direct tap computation is performed to compute the optimal equalizer tap coefficients corresponding to the channel estimate (the equalizer tap coefficients being calculated using the EQ 355). In another embodiment, the repeated adaptation is used to converge the equalizer tap coefficients directly without obtaining an estimate of the channel first (the equalizer tap coefficients being converged using the repeated adaptation 353 within the EQ 355). The present invention is able to accommodate, rather quickly, any dynamic channel characteristics of the wireless communication channel.

FIG. 4 is a system diagram illustrating an embodiment of a high definition television (HDTV) communication system 400 that is built in accordance with certain aspects of the present invention. An HDTV transmitter 410 includes a wireless tower 411. The HDTV transmitter 410, using its wireless tower 411, transmits a signal to an HDTV set top box receiver 420 via a wireless communication channel. The HDTV set top box receiver 420 includes the functionality to receive the wireless transmitted signal. The HDTV set top box receiver 420 is also communicatively coupled to an HDTV display 430 that is able to display the demodulated and decoded wireless transmitted signals received by the HDTV set top box receiver 420.

The HDTV set top box receiver 420 is then able to perform repeated adaptation, as shown in a functional block 423, on the received signal. The repeated adaptation 423 may be performed during channel equalization and/or channel estimation, as shown within the channel estimator (W) 424 and the EQ 425. The FIG. 4 shows just one of many embodiments where the repeated adaptation, performed in accordance with the present invention, may be performed to provide for improved and faster converging channel estimation and/or channel equalization. In addition, in some embodiment of the HDTV communication system 400, the repeated adaptation 423 generates a very accurate estimate of the wireless communication channel (using the channel estimator (W) 424), and then direct tap computation is performed to compute the optimal equalizer tap coefficients corresponding to the channel estimate (the equalizer tap coefficients being calculated using the EQ 425). In another embodiment, the repeated adaptation is used to converge the equalizer tap coefficients directly without obtaining an estimate of the channel first (the equalizer tap coefficients being converged using the repeated adaptation 423 within the EQ 425). The present invention is able to accommodate, rather quickly, any dynamic channel characteristics of the wireless communication channel.

FIG. 5 is a system diagram illustrating an embodiment of a communication system 500 that is built in accordance with certain aspects of the present invention. The FIG. 5 shows communicative coupling, via a dynamically changing communication channel 599, between two transceivers, a transceiver 501 and a transceiver 502. The dynamically changing communication channel 599 may be a wireline communication channel or a wireless communication channel.

Each of the transceivers 501 and 502 includes a transmitter and a receiver. For example, the transceiver 501 includes a transmitter 549 and a receiver 540; the transceiver 501 includes a transmitter 559 and a receiver 530. The receivers 540 and 530, within the receivers 501 and 502, respectively, are each operable to perform repeated adaptation in accordance with the present invention. This repeated adaptation, performed in each transceiver, is performed in the channel estimation and/or channel equalization modes of operation on signals received from the other transceiver. This will allow improved signal processing for both of the receivers 501 and 502, in that, they will be able to perform improved channel equalization and channel estimation.

For example, the receiver 540, within the transceiver 501, is able to perform repeated adaptation, as shown in a functional block 541, on a signal received from the transmitter 559 of left the transceiver 502. The repeated adaptation 541 may be performed during channel equalization and/or channel estimation, as shown within the channel estimator (W) 543 and the EQ 545. The FIG. 5 shows just one of many embodiments where the repeated adaptation, performed in accordance with the present invention, may be performed to provide for improved and faster converging channel estimation and/or channel equalization. In addition, in some embodiment of the communication system 500, the repeated adaptation 541 generates a very accurate estimate of the wireless communication channel (using the channel estimator (W) 543), and then direct tap computation is performed to compute the optimal equalizer tap coefficients corresponding to the channel estimate (the equalizer tap coefficients being calculated using the EQ 545). In another embodiment, the repeated adaptation is used to converge the equalizer tap coefficients directly without obtaining an estimate of the channel first (the equalizer tap coefficients being converged using the repeated adaptation 541 within the EQ 545). The present invention is able to accommodate, rather quickly, any dynamic channel characteristics of the wireless communication channel.

In addition, the receiver 530, within the transceiver 502, is able to perform repeated adaptation, as shown in a functional block 531, on a signal received from the transmitter 549 of the transceiver 501. The repeated adaptation 531 may be performed during channel equalization and/or channel estimation, as shown within the channel estimator (W) 533 and the EQ 535. Again, the FIG. 5 shows just one of many embodiments where the repeated adaptation, performed in accordance with the present invention, may be performed to provide for improved and faster converging channel estimation and/or channel equalization. In addition, in some embodiment of the communication system 500, the repeated adaptation 531 generates a very accurate estimate of the wireless communication channel (using the channel estimator (W) 533), and then direct tap computation is performed to compute the optimal equalizer tap coefficients corresponding to the channel estimate (the equalizer tap coefficients being calculated using the EQ 535). In another embodiment, the repeated adaptation is used to converge the equalizer tap coefficients directly without obtaining an estimate of the channel first (the equalizer tap coefficients being converged using the repeated adaptation 531 within the EQ 535). The present invention is able to accommodate, rather quickly, any dynamic channel characteristics of the wireless communication channel.

It is noted here that while many of the embodiments described within this patent application describe those communication systems employing wireless communication channels, the present invention is equally applicable within wireline communication systems without degrading any performance. There are certain embodiments where even landline systems may have a dynamically changing communication channel. While this is clearly the case in wireless communication applications (dynamically changing communication channel), it may at least one occur in wireline communication applications as well. The communication system 500 may be a wireless communication application in one embodiment; it may be a wireline communication application in another embodiment.

Figure 6:
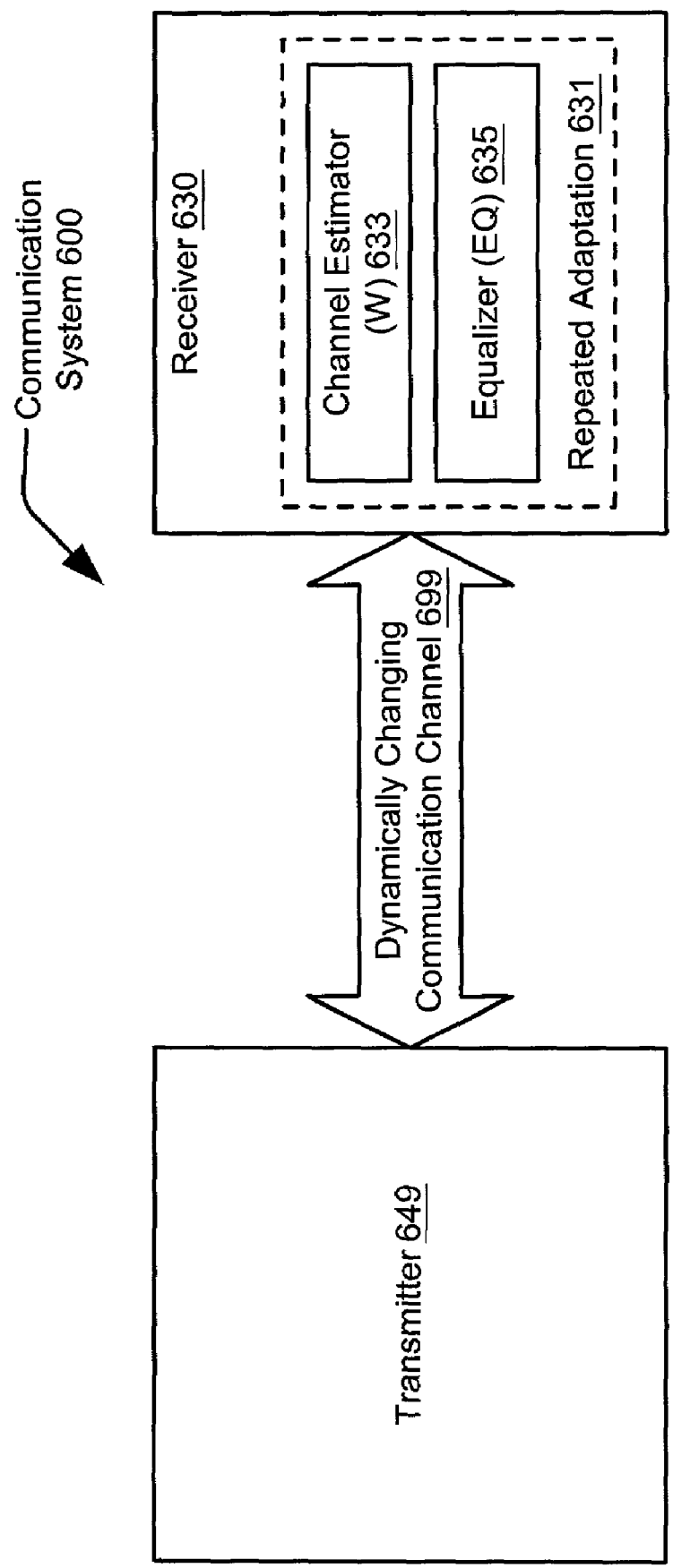
FIG. 6 is a system diagram illustrating another embodiment of a communication system that is built in accordance with certain aspects of the present invention.

FIG. 6 is a system diagram illustrating another embodiment of a communication system 600 that is built in accordance with certain aspects of the present invention. The FIG. 6 shows communicative coupling, via a dynamically changing communication channel 699, between a transmitter 649 and a receiver 630. The dynamically changing communication channel 699 may be a wireline communication channel or a wireless communication channel.

The receiver 630 is operable to perform repeated adaptation in accordance with the present invention. This repeated adaptation, performed within the receiver 630, is performed in the channel estimation and/or channel equalization modes of operation on signals received from the transmitter 649. This will allow improved signal processing for the receiver 630, in that, it will be able to perform improved channel equalization and channel estimation.

For example, the receiver 630 is able to perform repeated adaptation, as shown in a functional block 631, on a signal received from the transmitter 649. The repeated adaptation 631 may be performed during channel equalization and/or channel estimation, as shown within the channel estimator (W) 633 and the EQ 635. The FIG. 6 shows just one of many embodiments where the repeated adaptation, performed in accordance with the present invention, may be performed to provide for improved and faster converging channel estimation and/or channel equalization. In addition, in some embodiment of the communication system 600, the repeated adaptation 631 generates a very accurate estimate of the wireless communication channel (using the channel estimator (W) 633), and then direct tap computation is performed to compute the optimal equalizer tap coefficients corresponding to the channel estimate (the equalizer tap coefficients being calculated using the EQ 645). In another embodiment, the repeated adaptation is used to converge the equalizer tap coefficients directly without obtaining an estimate of the channel first (the equalizer tap coefficients being converged using the repeated adaptation 631 within the EQ 635). The present invention is able to accommodate, rather quickly, any dynamic channel characteristics of the wireless communication channel.

Figure 7:
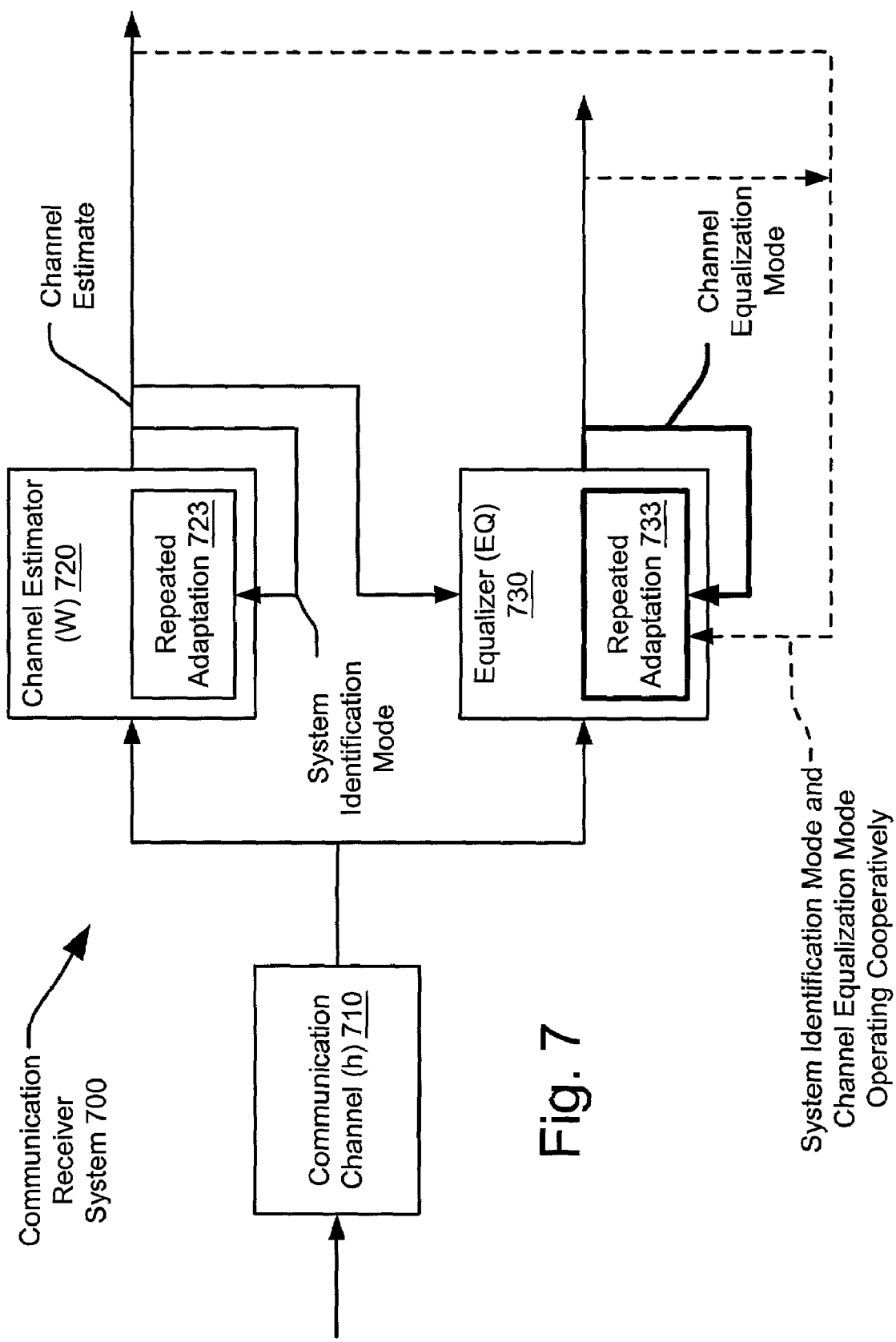
FIG. 7 is a system diagram illustrating an embodiment of a communication receiver system that is built in accordance with certain aspects of the present invention.

FIG. 7 is a system diagram illustrating an embodiment of a communication receiver system 700 that is built in accordance with certain aspects of the present invention. An input signal is transmitted across a communication channel 710 having a response (h). As described above in many of the various embodiments, an input signal may be undesirably transformed as it is transmitted across the communication channel 710. The signal, received across the communication channel 710, is provided to a channel estimator (W) 720 and an EQ 730. Both the channel estimator (W) 720 and an EQ 730 are each operable to perform repeated adaptation, as shown in functional blocks 723 and 733, respectively. The output of the channel estimator (W) 720 is shown as a channel estimate; the channel estimate is representative of the characteristics of the communication channel 720. This channel estimate is a very accurate estimate of the actual response of the communication channel 710. The repeated adaptation 723, within the channel estimator (W) 720, is performed during the system identification mode where the estimate of the communication channel 710 is performed.

Then, in some embodiments, the output of the channel estimator (W) 720 is provided to the EQ 730. In this embodiment, a very accurate estimate of the communication channel 710 is made (using the channel estimator (W) 720), and then direct tap computation is performed to compute the optimal equalizer tap coefficients corresponding to the channel estimate (the equalizer tap coefficients being calculated using the EQ 730).

However, the operation of the communication receiver system 700 may be modified in the channel equalization mode. In another embodiment, the repeated adaptation 733, within the EQ 733, is used to converge the equalizer tap coefficients directly without obtaining an estimate of the channel first (the equalizer tap coefficients being converged using the repeated adaptation 733 within the EQ 733).

In even other embodiments, the degree to which the channel estimate, within the channel estimator (W) 720, converges is not totally complete. Yet, the channel estimator (W) 720 does not totally converge. Then, this not totally converged output from the channel estimator (W) 720 is provided as input to the repeated adaptation 733 within the EQ 730. Then, taking this improved, yet incomplete channel estimate from the channel estimator (W) 720, the repeated adaptation 733, within the EQ 733, is used to converge the equalizer tap coefficients starting from this improved, yet incomplete channel estimate. That is to say, the equalizer tap coefficients are converged using the repeated adaptation 733 within the EQ 733. This situation may be viewed as the system identification mode and the channel equalization mode operating cooperatively.

Figure 8:
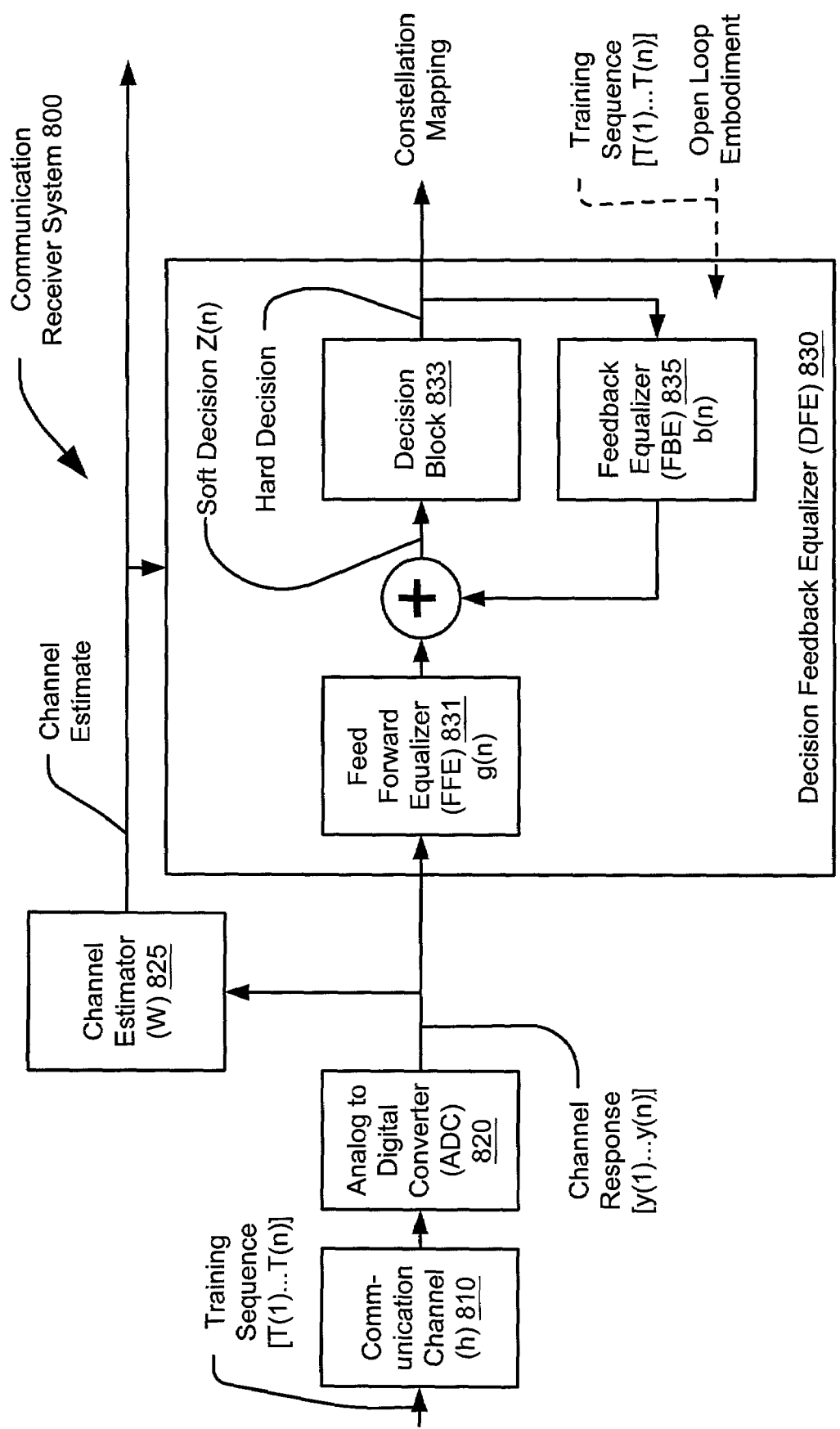
FIG. 8 is a system diagram illustrating another embodiment of a communication receiver system that is built in accordance with certain aspects of the present invention.

FIG. 8 is a system diagram illustrating another embodiment of a communication receiver system 800 that is built in accordance with certain aspects of the present invention. A training sequence [T(1) . . . T(n)] is transmitted across a communication channel (h) 810. The channel modified training sequence [T(1) . . . T(n)] is provided to an analog to digital converter (ADC) 820. Then, this digital format of the channel response of the communication channel [y(1) . . . y(n)] is simultaneously provided to a channel estimator (W) 825 and also to a decision feedback equalizer (DFE) 830. The output of the channel estimator (W) 825 is a channel estimate. This channel estimate may be provided to other functional blocks. Alternatively, the channel estimate may be provided to the DFE 830. When the channel estimate is provided to the DFE 830, this may be viewed as being the system identification mode of operation of the communication receiver system 800.

The DFE 830 includes a feed forward equalizer (FFE) 831 having a response g(n), a summing node, a decision block 833, and a feedback equalizer (FBE) 835 having a response b(n). The DFE 830 may be described as a is a non-linear equalizer which works by recognizing that ISI effects on a symbol that depends on previously transmitted symbols as well as symbols that are yet to come. The DFE 830 structure includes a feedback portion (the FBE 835) that subtracts the ISI effect of previously detected symbols from a current symbol. The only unknown is then the effect of symbols that have not yet been detected, which is minimized by appropriate (feed forward) filtering (using the FFE 831).

The output of the FFE 831 is provided to the summing node. The output of the summing node is provided to the decision block; this input may be decided as a soft decision Z(n) of the bits within the signal that have been transmitted across the communication channel 810. The decision block generates hard decisions that are used later for constellation mapping. This is where the actual bits are mapped to a symbol within the constellation. Again, the present invention may be implemented using a variety of modulation schemes including BPSK up to 1024 QAM modulation schemes. These hard decisions are also fed back to the summing node, after having passed through the FBE 835.

It is also noted that certain 'a priori' information may be provided to the DFE 830 so that it may operate in an open loop embodiment. A training sequence [T(1) ... T(n)] may be provided directly to the DFE 830. This 'a priori' information may be achieved by using offline modeling techniques of the actual communication channel, by performing computer modeling of the expected characteristics of the communication channel, or any other approach.

Some of the operational embodiments of the communication receiver system 800 may be described as follows: the communication receiver system 800 may perform repeated adaptation to generate a very accurate estimate of the communication channel 810, and then direct tap computation is performed to compute the optimal equalizer tap coefficients corresponding to the channel estimate (the equalizer tap coefficients being calculated using the DFE 830). In another embodiment, the repeated adaptation is used to converge the equalizer tap coefficients directly without obtaining an estimate of the channel first (the equalizer tap coefficients being converged using repeated adaptation within the DFE 830).

Figure 9:
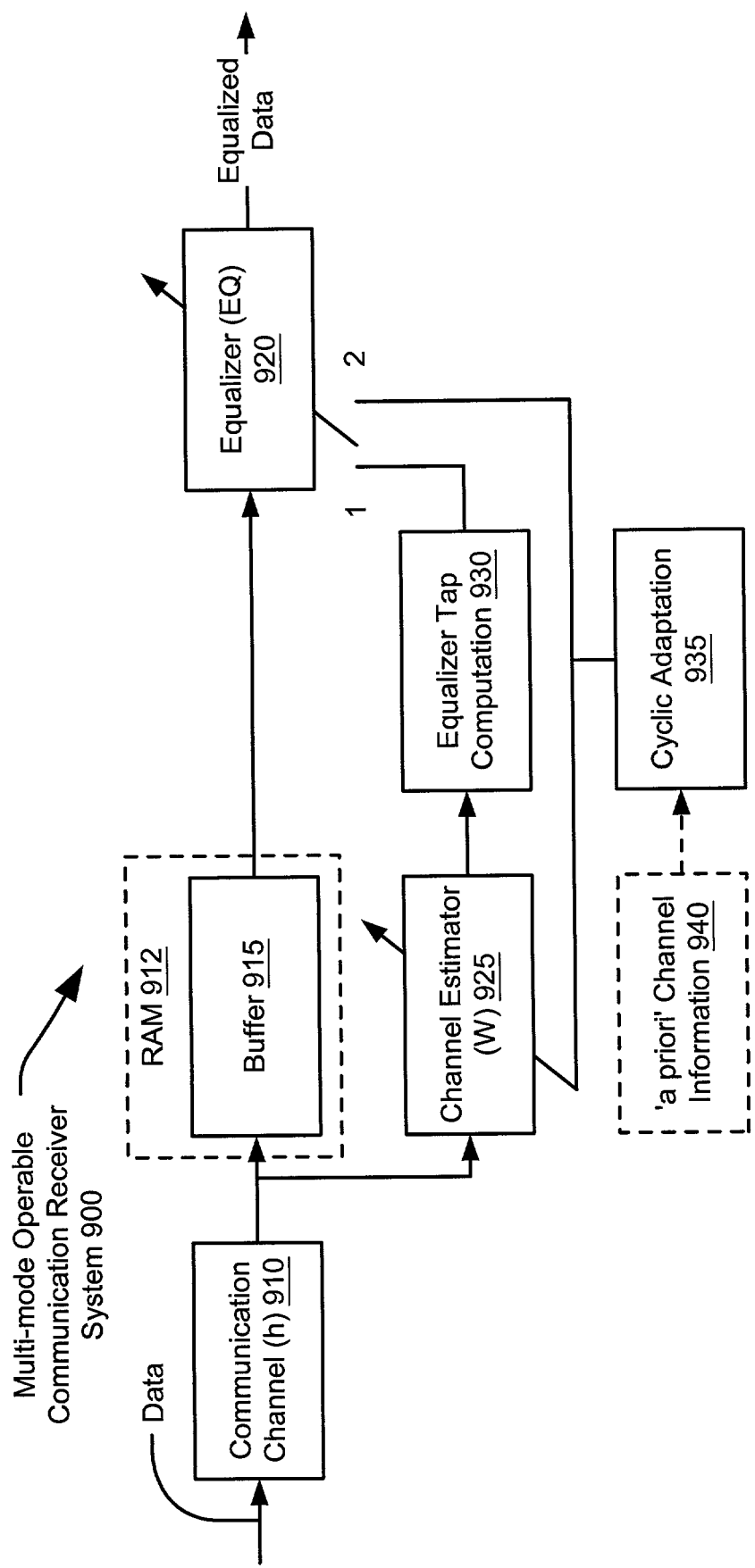
FIG. 9 is a system diagram illustrating an embodiment of a multi-mode operable communication receiver system that is built in accordance with certain aspects of the present invention.

FIG. 9 is a system diagram illustrating an embodiment of a multi-mode operable communication receiver system 900 that is built in accordance with certain aspects of the present invention. Again, the multi-mode operable communication receiver system 900 is operable using multiple modes of operation. In the first mode (labeled 1), a training sequence, received within data that have been transmitted across a communication channel (h) 910, is used to first estimate the channel (using a channel estimator (W) 925) and then direct tap computation is performed to compute the optimal equalizer tap coefficients corresponding to that channel estimate (performed using functional block 930 to perform equalizer tap computation for the EQ 920). The received training sequence may be stored in a buffer 915; this buffer 915 may be implemented using random access memory (RAM) 912. In this mode of operation, the repeated adaptation operation may be referred to as the cyclic adaptation within the functional block 935. This operation may be viewed as being within the system identification mode, where it tries to estimate the channel using the training sequence and the received sequence. The adaptive method used cyclically could be any adaptive method such as LMS, RLS, CMA, ... etc., and many of their variants.

In a second operational mode (labeled 2), the repeated adaptation operation, which may be referred to as the cyclic adaptation within the functional block 935, is employed directly to converge the equalizer tap coefficients themselves without obtaining a channel estimate first. Here the operation of the multi-mode operable communication receiver system 900 is performed using the channel equalization mode.

Another way to describe the operation of the repeated adaptation, as performed in accordance with the present invention, is as follows: An example of the proposed repeated adaptation approach is to do channel estimation using a received sequence y(i) and a training sequence x(i), where I is the sampling index. A conventional LMS method will estimate the channel using the following recursion:

$$w_{i+1} = w_i + \mu x^T(y(i) - w_i^T x_i), i=1,2,\ldots,N$$

where N is the length of the training sequence, $w_i$ is the channel estimate vector, and $x_i$ is the training sequence vector. The cyclic adaptive LMS method recursion should be:

$$w_{i+1} = Q(w_i) + \mu x_j^T(y(j) - w_i^T x_j), i=1,2,\ldots,KN$$

where $$j = i - N \mathrm{mod}[i/N]$$

K is the number of cycles, and Q(w) is a projection function that brings the estimate w to the closest point of the 'a priori' information. This 'a priori' channel information 940 may be provided to assist in the cyclic adaptation 935 so that quicker convergence may be achieved.

It is also noted that that the same repeated adaptation concept is applicable to all adaptive approaches in both channel estimation and/or equalization modes. It also applies to blind and non-blind methods.

The prior art approaches to performing channel estimation and typically require either a huge number of multipliers to invert a matrix or a huge memory for storing the matrix inverse (if known 'a priori'). However, using the repeated adaptation in accordance with the present invention, a significantly reduced number of multiplies and a relatively reasonable amount of RAM 912 is needed for buffering the data. However, the repeated adaptation approach performed in accordance with the present invention, using the cyclic adaptive approach, does in fact approach the same precision of the prior art and computationally intensive least-squares performance approach.

Figure 10:
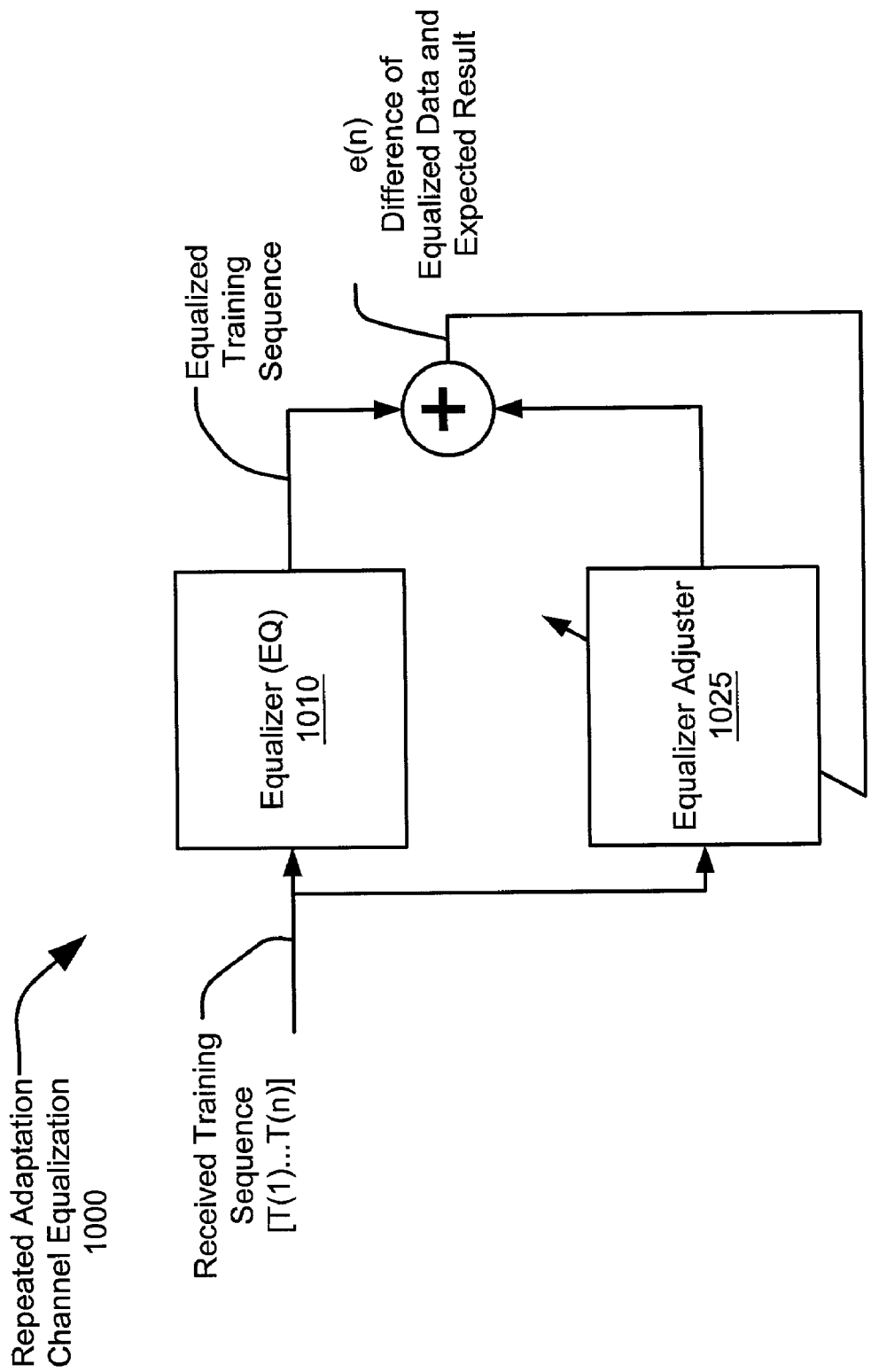
FIG. 10 is a functional block diagram illustrating an embodiment of repeated adaptation channel equalization that is performed in accordance with certain aspects of the present invention.

FIG. 10 is a functional block diagram illustrating an embodiment of repeated adaptation channel equalization 1000 that is performed in accordance with certain aspects of the present invention. A received training sequence [T(1) ... T(n)] is provided simultaneously to an EQ 1010 and an equalizer adjuster 1025. The output of the EQ 1010 is an equalized training sequence. This equalized training sequence is provided to a summing node. In addition, the output of the equalizer adjuster 1025 is also provided to the summing node. The output of the summing node is the difference e(n) of the equalized training sequence and the expected result of the received training sequence [T(1) ...

T(n)]. The repeated adaptation channel equalization 1000 shows how the EQ 1010 may be operated to perform tap computation thereby arriving at the optimal equalizer tap coefficients corresponding to a communication channel across which the training sequence [T(1) ... T(n)] has been transmitted.

Figure 11:
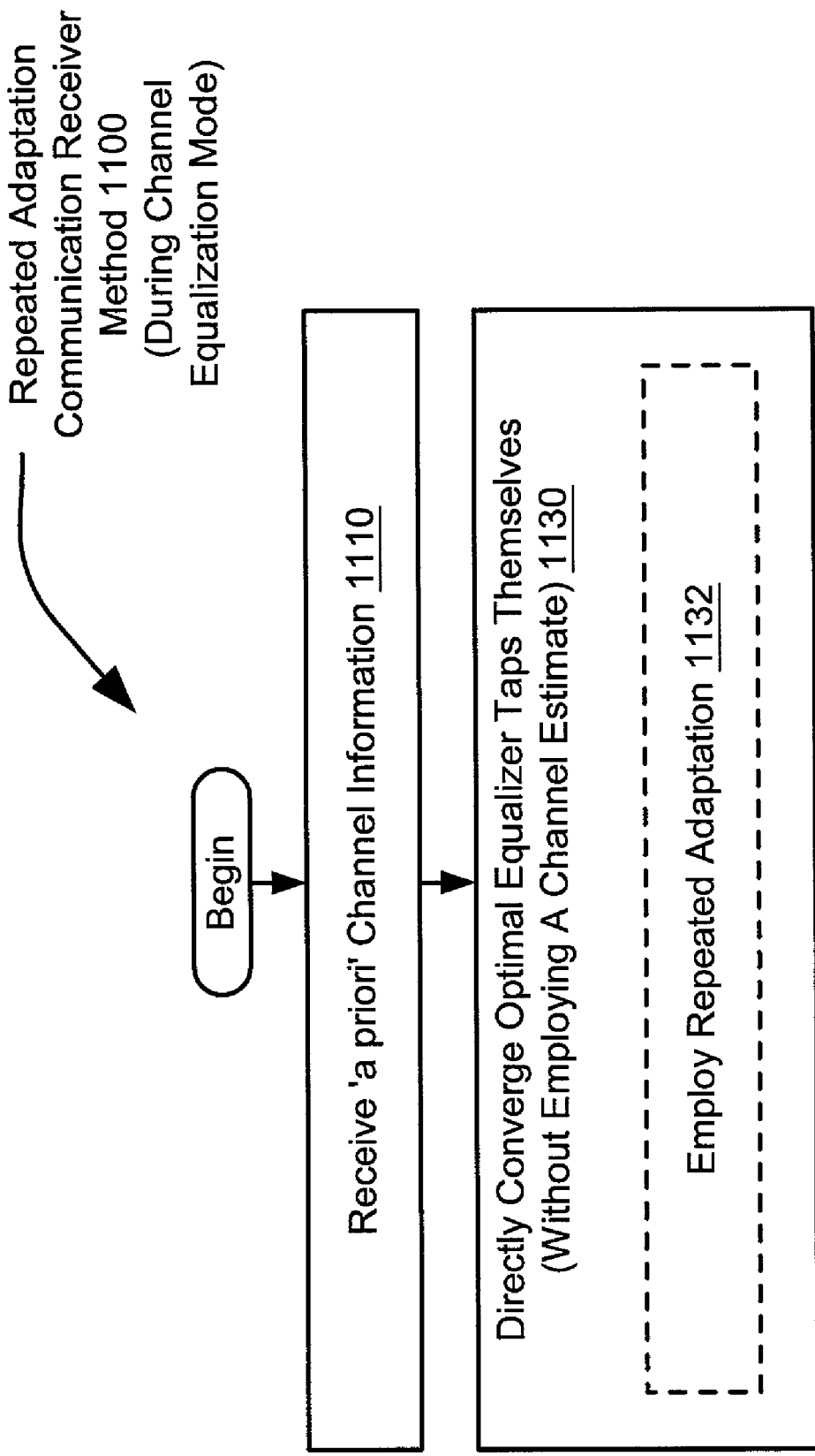
FIG. 11 is a flow diagram illustrating an embodiment of a repeated adaptation communication receiver method, performed in accordance with certain aspects of the present invention, during channel equalization mode.

FIG. 11 is a flow diagram illustrating an embodiment of a repeated adaptation communication receiver method 1100, performed in accordance with certain aspects of the present invention, during channel equalization mode. In a block 1110, 'a priori' channel information is received. This 'a priori' channel information may be achieved by using offline modeling techniques of the actual communication channel, by performing computer modeling of the expected characteristics of the communication channel, or any other approach. Such 'a priori' channel information can speed up the convergence of the adaptive method and reduce the number of needed cycles for channel equalization as shown in the FIG. 11.

Then, in a block 1130, calculations are performed to converge to the optimal equalizer tap coefficients directly without obtaining an estimate of the channel first. This direct calculation is performed by employing repeated adaptation, as shown in a block 1132.

Figure 12:
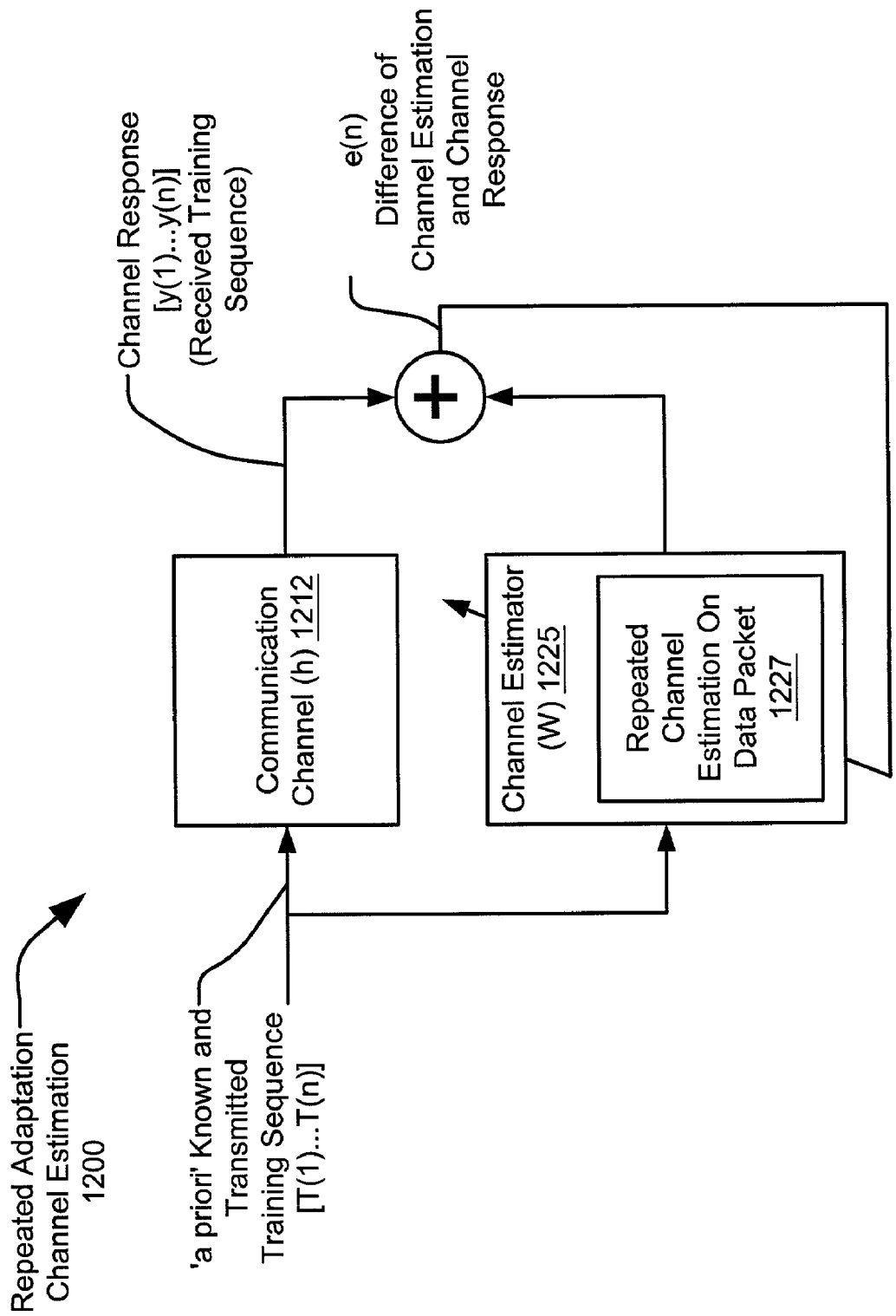
FIG. 12 is a functional block diagram illustrating an embodiment of repeated adaptation channel estimation that is performed in accordance with certain aspects of the present invention.

FIG. 12 is a functional block diagram illustrating an embodiment of repeated adaptation channel estimation 1200 that is performed in accordance with certain aspects of the present invention. An 'a priori' known training sequence [T(1) ... T(n)] is provided simultaneously to a communication channel (h) 1210 and a channel estimator (W) 1225. The channel estimator (W) 1225 performs repeated channel estimation on a data packet as shown in a block 1227. This repeated channel estimation may be achieved by repeating the adaptation to the same training sequence [T(1) ... T(n)]. This training sequence [T(1) ... T(n)] may be stored in a buffer and repeated retrieved so that the repeated adaptation may be performed on the training sequence [T(1) ... T(n)].

The output of the communication channel 1210 is a channel response [y(1) ... y(n)]; this channel response [y(1) ... y(n)] may be viewed as the communication channel modified training sequence [T(1) ... T(n)]. This is provided to a summing node. In addition, the output of the channel estimator (W) 1225 is also provided to the summing node. The output of the summing node is the difference of the channel response [y(1) ... y(n)] and the expected output result of the channel estimator (W) 1225; this is the difference e(n) between the channel estimate and the channel response. The repeated adaptation channel estimation 1200 shows how channel estimation may be operated to generate a very accurate estimate of the communication channel 1212.

Figure 13:
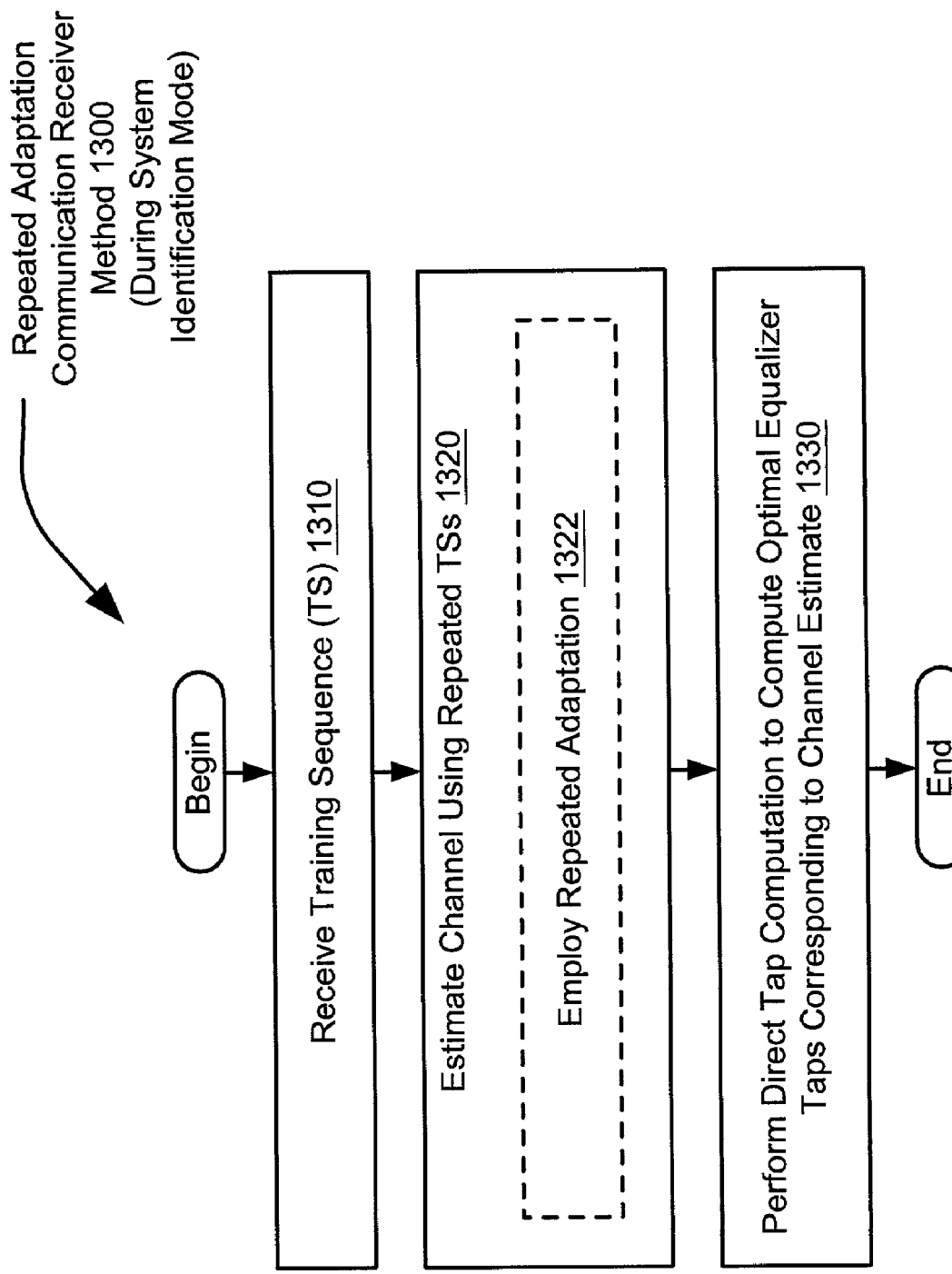
FIG. 13 is a flow diagram illustrating an embodiment of a repeated adaptation communication receiver method, performed in accordance with certain aspects of the present invention, during system identification mode employing channel estimation.

FIG. 13 is a flow diagram illustrating an embodiment of a repeated adaptation communication receiver method 1300, performed in accordance with certain aspects of the present invention, during system identification mode employing channel estimation. A TS is received in a block 1310. Then, using repeated copies of this received TS (e.g., repeated TSs as depicted in the diagram), a channel estimate is made of a communication channel as shown in a block 1320. This channel estimation is may be performed by employing repeated adaptation in accordance with the present invention, as shown in a block 1322. Then, in a block 1330, direct tap computation is performed to compute the optimal equalizer tap coefficients corresponding to the channel estimate; the channel estimation that is used is the channel estimate achieved in the block 1320.

Figure 14:
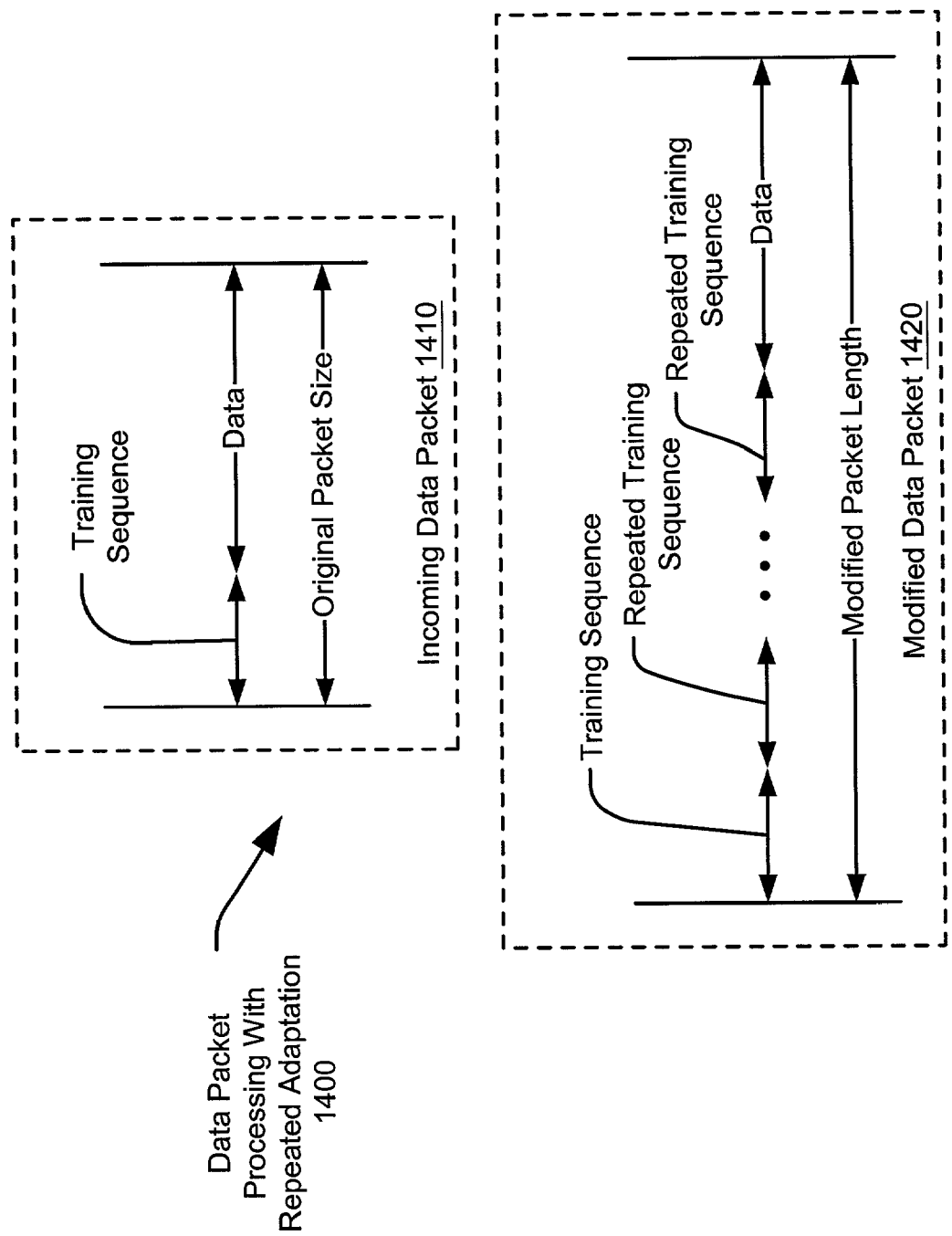
FIG. 14 is a diagram illustrating an embodiment of data packet processing with repeated adaptation that is performed in accordance with certain aspects of the present invention.

FIG. 14 is a diagram illustrating an embodiment of data packet processing with repeated adaptation 1400 that is performed in accordance with certain aspects of the present invention. An incoming data packet 1410 is shown as having an original packet size that is composed of a TS portion and a data portion. Typically, as throughput rates of communication systems continually seeks to increase, the size of the TS continues to decrease in length. This can be problematic, in that, there is an insufficient amount of TS information or time to converge to an accurate channel estimate or to converge at the optimal equalizer tap coefficients within an equalizer.

The present invention provides for repeating the TS multiple times, so that a modified data packet 1420 may be generated. This modified data packet 1420 may be viewed as having the same data portion of the incoming data packet 1410, yet it also has a number of TSs, shown as a TS, a repeated TS, . . . , and (in some embodiments) another repeated TS. These repeated TSs may be generated by storing the original TS in a buffer, and then retrieving copies of the original TS to generate the modified data packet 1420. The number of repeated TSs may be programmed to adapt to the particular application, or to the computational functionality of the channel estimation and/or channel equalization that is to be performed in a given embodiment. The data packet processing with repeated adaptation 1400 may be performed in the channel estimation and/or channel equalization that are/is performed in accordance with the present invention.

Figure 15:
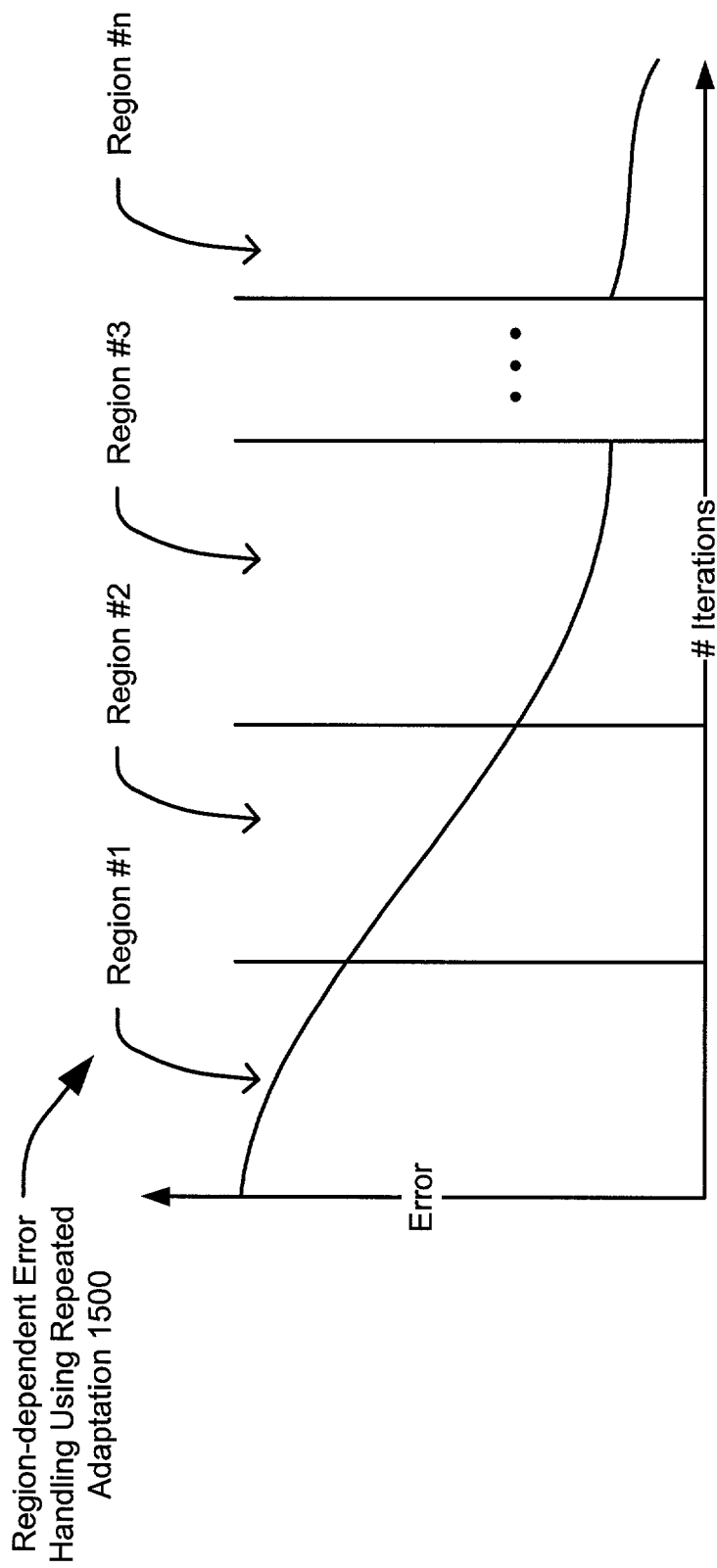
FIG. 15 is a diagram illustrating an embodiment of region-dependent error handling, using repeated adaptation, that is performed in accordance with certain aspects of the present invention.

FIG. 15 is a diagram illustrating an embodiment of region-dependent error handling 1500, using repeated adaptation, that is performed in accordance with certain aspects of the present invention. Borrowing on the repeated nature of the present invention, groups of cycles of the repeated adaptation may be further grouped together to achieve even better performance; this may be referred to as region-dependent error handling within the scope and spirit of repeated adaptation. For example, different number of iterations may be employed within the various regions; different step sizes may be used in the different regions. If desired, a threshold may or may not be used in the different regions to determine when the repeated adaptation is finished within that particular region; alternatively, a predetermined number of iterations may be performed in a region irrespective of the error remaining in the channel equalization and/or channel estimation approach.

For example, the region-dependent error handling 1500 is shown to decrease the error as the number of iterations increases. The iterations are grouped into a number of regions, shown as a region #1, a region #2, a region #3, . . . , and a region #n. The particular processing within the various regions may be programmable and different than one another. For example, one embodiment of region-dependent is shown in the table. This shows just one example of how some parameters may be used in performing the region-dependent error handling 1500. In the region #1, 'K1' iterations are performed; the step size is 'S1'; and the threshold used to determine whether convergence has occurred is shown as 'T1'. In the region #2, 'K2' iterations are performed; the step size is 'S2', which is less than 'S1'; and no threshold is used to determine whether convergence has occurred—the total number of 'K2' iterations is performed without determining whether the error handling has converged. In the region #3, 'K3' iterations are performed; the step size is 'S3', which is less than 'S2'; and the threshold used to determine whether convergence has occurred is shown as 'T2'. The region-dependent error handling 1500 continues, and in the region #n, 'Kn' iterations are performed; the step size is 'Sn'; and the threshold used to determine whether convergence has occurred is shown as 'Tn'.

It is noted that in some embodiments, the particular number of iterations, step size, and threshold may also be the same in all regions. However, some design implementations may be employed where the values are all different within the various regions.

In one embodiment, the region-dependent error handling 1500 employs three different regions, each programmed with 10 iterations. The first region employs a relatively large step size, a threshold of a predetermined value, and channel equalization is performed to adapt the equalizer tap coefficients using a large constraint. Then, in the second region, no threshold is used to determine whether convergence has been reached, all 10 iterations are made, and a smaller step size (compared to the first region) is used. Then, in the third and final region, an even smaller step size is used than in the second region, to provide for even more refined convergence.

Again, the region-dependent error handling 1500 may be implemented in performing channel estimation and/or channel equalization without departing from the scope and spirit of the invention.

Figure 16:
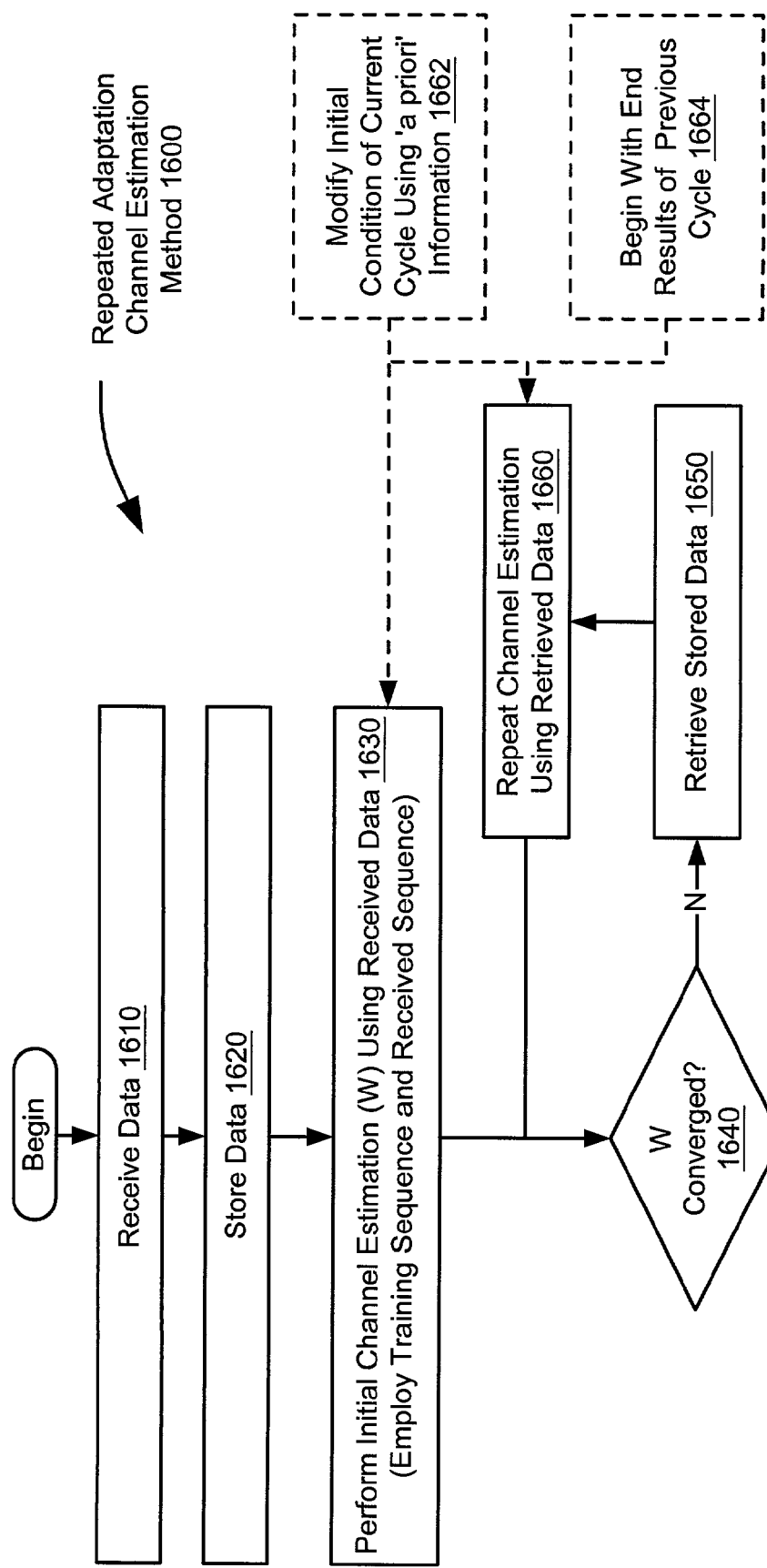
FIG. 16 is a flow diagram illustrating an embodiment of a repeated adaptation channel estimation method that is performed in accordance with certain aspects of the present invention.

FIG. 16 is a flow diagram illustrating an embodiment of a repeated adaptation channel estimation method 1600 that is performed in accordance with certain aspects of the present invention. In a block 1610, data is received. This data may include a TS portion and a data portion (a received sequence). The data is stored in a block 1620. This storing may include only storing the TS portion or the data portion (the received sequence), or it may include storing both.

In a block 1630, initial channel estimation is performed using the received data. This channel estimation (W) is performed by employing the TS and the data portion (the received sequence). In a decision block 1640, it is determined whether the initial channel estimation (W), performed in the block 1630, has in fact converged. If it has, then the repeated adaptation channel estimation method 1600 terminates.

However, if it is determined that the initial channel estimation (W), performed in the block 1630, has not yet converged, then the stored data is retrieved as shown in a block 1650. Then, channel estimation is repeated, as shown in a block 1660, to try to converge the channel estimation process. The repeated adaptation channel estimation method 1600 then proceeds to the decision block 1640. This process may continue until the repeated adaptation channel estimation method 1600, particularly the channel estimation (W), converges to within a desired precision. It is noted that a threshold may be used in the decision block 1640 to discern when convergence has occurred.

It is also noted, in some embodiments, that 'a priori' information may be used to assist in the channel estimation processing within the repeated adaptation channel estimation method 1600. For example, the initial condition of a current cycle ('a priori' information), as shown in a block 1662, may be used to assist in the channel estimation processes during either the initial channel estimation in the block 1630 and/or the repeated channel estimation in the block 1660. In addition, as shown in a block 1664, the iterative cycles of channel estimation may be performed using the end results of a previous cycle. This information may be viewed as being the degree of convergence that the channel estimation actually achieved in the previous iterative cycle of channel estimation.

Figure 17:
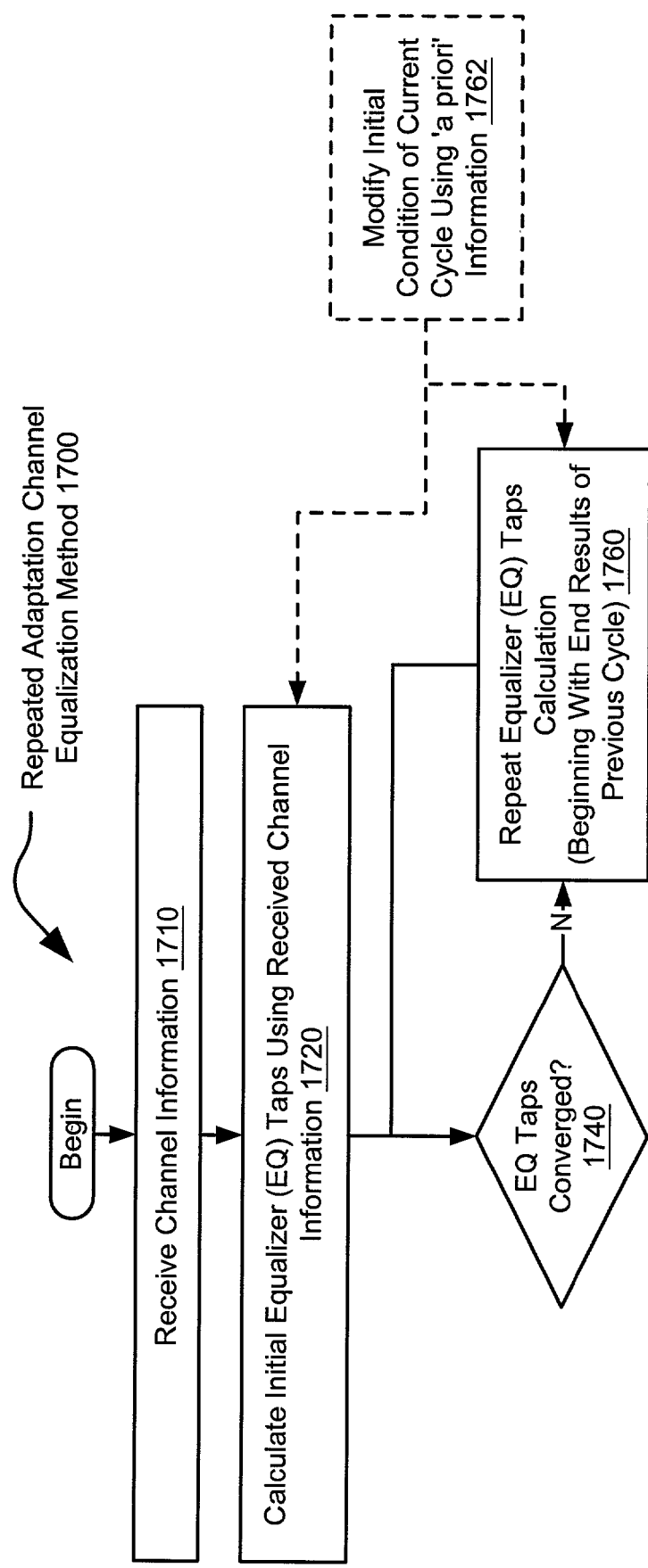
FIG. 17 is a flow diagram illustrating an embodiment of a repeated adaptation channel equalization method that is performed in accordance with certain aspects of the present invention.

FIG. 17 is a flow diagram illustrating an embodiment of a repeated adaptation channel equalization method 1700 that is performed in accordance with certain aspects of the present invention. In a block 1710, channel information is received. Then, in a block 1720, the initial values for the equalizer tap coefficients are calculated using the channel information received in the block 1710. In a decision block 1740, it is determined whether the calculations for the equalizer tap coefficients have in fact converged. A predetermined threshold may be used to determine whether convergence has occurred. If it has, then the repeated adaptation channel equalization method 1700 terminates.

However, if it is determined that the initial equalizer tap calculation, performed in the block 1720, has not yet converged, then repeated adaptation is performed where the equalizer tap calculation is repeated. This repeated equalizer tap calculation is performed beginning with the end results that had been achieved in the previous iterative cycle. The repeated adaptation channel equalization method 1700 then proceeds back to the decision block 1740 to determine if the equalizer tap calculations have yet converged. This process may continue until the repeated adaptation channel equalization method 1700, particularly the channel equalization, converges to within a desired precision. Again, a threshold may be used in the decision block 1740 to discern when channel equalization convergence has occurred.

It is also noted, in some embodiments, that 'a priori' information may be used to assist in the channel estimation processing within the repeated adaptation channel equalization method 1700. For example, the initial condition of a current cycle ('a priori' information), as shown in a block 1762, may be used to assist in the channel equalization processes during either the initial equalizer tap calculations in the block 1730 and/or the repeated equalizer tap calculations in the block 1760.

Figure 18:
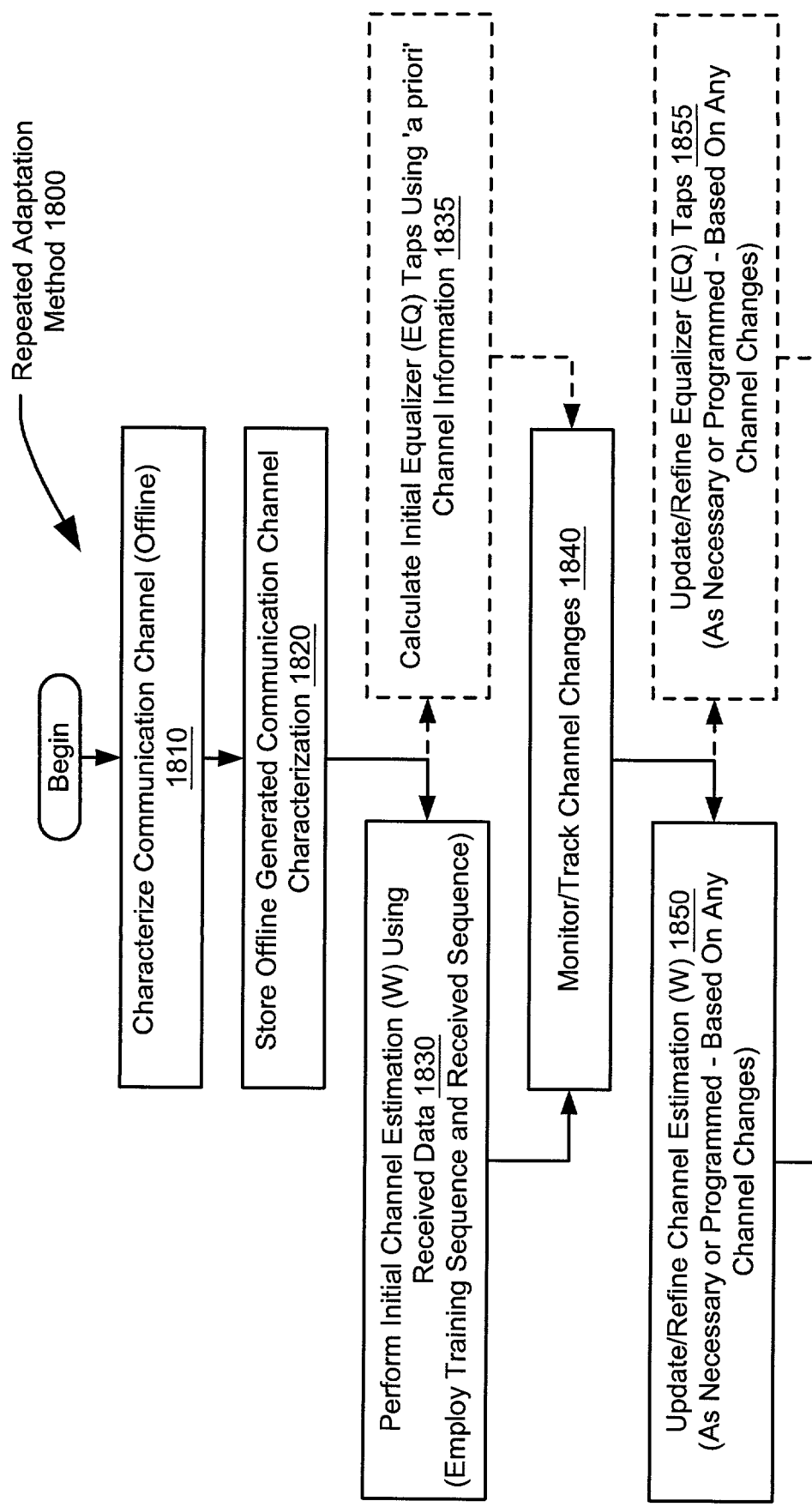
FIG. 18 is a flow diagram illustrating an embodiment of a repeated adaptation method that is performed in accordance with certain aspects of the present invention.

FIG. 18 is a flow diagram illustrating an embodiment of a repeated adaptation method 1800 that is performed in accordance with certain aspects of the present invention. In a block 1810, a communication channel is characterized offline. Then, in a block 1820, this communication channel characterization information, that has been generated offline, is stored. This storing may be in a buffer that may itself be RAM.

Then, in one embodiment, as shown in a block 1830, initial channel estimation (W) is performed using received data. This channel estimation is performed using a TS and a received sequence. Then, after the channel estimation has converged, then any changes in the communication channel are tracked in a block 1840. Then, in a block 1850, updating and/or refining of the channel estimation (W) is performed based on any detected changes on the communication channel. The updating and/or refining of the channel estimation (W) may be performed as deemed necessary when there is a perturbation in the communication channel, a change in the communication channel, or simply after a programmed period of time where the system re-initializes to compensate for any anticipated/expected changes in the communication channel.

In another embodiment, as shown in a block 1835, initial channel equalizer tap calculations are performed using 'a priori' channel information. Then, after the channel equalizer tap calculations have converged, then any changes in the communication channel are tracked in the block 1840. Then, in a block 1855, updating and/or refining of the channel equalizer tap calculations is performed based on any detected changes on the communication channel. Similar to the channel estimation (W), the updating and/or refining of the channel it equalizer tap calculations may be performed as deemed necessary when there is a perturbation in the communication channel, a change in the communication channel, or simply after a programmed period of time where the system re-initializes to compensate for any anticipated/expected changes in the communication channel.

The operation of the repeated adaptation method 1800 may also be described, in one embodiment, as generating a very accurate estimate of a communication channel (using channel estimation (W)), and then direct tap computation is performed to compute the optimal equalizer tap coefficients corresponding to the channel estimate (the equalizer tap coefficients being calculated using the channel equalizer tap calculations). In another embodiment, the repeated adaptation is used to converge the equalizer tap coefficients directly without obtaining an estimate of the channel first (the equalizer tap coefficients being converged using the channel equalizer tap calculations). It is also noted that both the channel estimation aspects and the channel equalization aspect of the repeated adaptation method 1800 may be performed simultaneously in a given embodiment. The present invention is able to accommodate, rather quickly, any dynamic channel characteristics of the wireless communication channel. The present invention is particularly adaptable to multiple embodiments of wireless communication systems where the characteristics of the wireless communication channel may change very rapidly as understood by those persons having skill in the art.

The present invention, while employing repeated adaptation in channel estimation and/or channel equalization allows a low complexity adaptive approach to converge to optimal channel estimation and/or channel equalization (converge to the optimal equalizer tap coefficients) solutions with relatively low complexity. It also reduces the needed training sequence length to achieve a certain channel estimation/channel equalization performance.

In view of the above detailed description of the invention and associated drawings, other modifications and variations will now become apparent to those skilled in the art. It should also be apparent that such other modifications and variations may be effected without departing from the spirit and scope of the invention.

What is claimed is:

1. A communication receiver that is operable to receive a signal that is transmitted via communication channel, the received signal comprising a training sequence portion and a data portion, the communication receiver comprising:
   a channel estimation block that is operable to estimate a characteristic of a communication channel; and
   a channel equalizer block that is operable to calculate a plurality of channel equalizer tap coefficients, the plurality of channel equalizer tap coefficients being used to equalize for any communication channel-induced changes within the received signal; and
   wherein the channel estimation block and the channel equalizer block performs repeated adaptation;
   the channel estimation block being operable to employ repeated adaptation on the training sequence portion and the data portion, the repeated adaptation of the channel estimation block being performed using a plurality of channel estimation cycles; and
   the channel equalizer block being operable to employ repeated adaptation on the training sequence and the data portion, wherein the channel equalizer block calculates the plurality of equalizer tap coefficients by performing repeated adaptation on the training sequence portion and the data portion using the plurality of channel equalizer cycles; and
   wherein the plurality of channel estimation cycles includes a plurality of regions; and wherein the channel estimation block performs region-dependent error handling using repeated adaptation on the training sequence portion and the data portion.

2. The communication receiver of claim 1, wherein the communication receiver receives, as input, 'a priori' information that corresponds to the characteristic of the communication channel.

3. The communication receiver of claim 2, wherein the channel estimation block employs the 'a priori' information that corresponds to the characteristic of the communication channel to modify an end condition of at least one of the channel estimation cycles.

4. The communication receiver of claim 2, wherein the channel equalizer block employs the 'a priori' information that corresponds to the characteristic of the communication channel to modify an end condition of at least one of the channel equalizer cycles.

5. The communication receiver of claim 1, wherein the channel equalizer block comprises a decision feedback equalizer.

6. The communication receiver of claim 1, further comprising a buffer; and
   wherein the communication receiver stores at least one of the training sequence portion and the data portion in the buffer; and
   the communication receiver retrieves at least one of the training sequence portion and the data portion from the buffer during at least one of a channel estimation cycle and a channel equalizer cycle.

7. The communication receiver of claim 1, wherein one region within the plurality of regions comprises a number of iterations, a step size, and a threshold.

8. The communication receiver of claim 7, wherein at least one additional region within the plurality of regions comprises the number of iterations and a step size smaller than the step size of the one region.

9. The communication receiver of claim 1, wherein the plurality of channel equalizer cycles comprises a plurality of regions; and
   wherein the channel equalizer block performs region-dependent error handling using repeated adaptation on the training sequence portion and the data portion to calculate the plurality of channel equalizer tap coefficients.

10. The communication receiver of claim 9, wherein one region within the plurality of regions comprises a number of iterations, a step size, and a threshold.

11. The communication receiver of claim 10, wherein at least one additional region within the plurality of regions comprises the number of iterations and a step size smaller than the step size of the one region.

12. The communication receiver of claim 1, wherein the communication receiver comprises a receive block that is contained within a transceiver.

13. The communication receiver of claim 1, wherein the communication receiver is contained within at least one of a base station receiver, a mobile receiver, a tower receiver, and a high definition television set top box.

14. A communication receiver that receives a signal that includes a training sequence portion and a data portion, the communication receiver comprising:

a channel estimator;
a channel equalizer that is operable to calculate a plurality of channel equalizer tap coefficients, the plurality of channel equalizer tap coefficients being used to equalize for any communication channel-induced changes within the received signal, the channel equalizer operable to be selectively communicatively coupled to the channel estimator; and
wherein the communication receiver being selectively operable within a system identification mode and a channel equalizer mode;
within the system identification mode, the channel estimator employs repeated adaptation on the received signal to estimate a characteristic of a communication channel and then provides the channel estimate to the channel equalizer, the channel equalizer then performing direct calculation of the plurality of equalizer tap coefficients;
within the channel equalizer mode, the channel equalizer employs repeated adaptation on the received signal to calculate the plurality of equalizer tap coefficients and performs region-dependent error handling using repeated adaptation on at least one of the training sequence portion and the data portion;
the repeated adaptation of the system identification mode includes a plurality of channel equalizer cycles having a plurality of regions; and
the repeated adaptation of the channel equalizer mode includes the plurality of channel equalizer cycles.

15. The communication receiver of claim 14, further comprising a buffer; and
wherein the communication receiver stores at least one of the training sequence portion and the data portion in the buffer.

16. The communication receiver of claim 15, wherein the channel estimator retrieves at least one of the training sequence portion and the data portion from the buffer during a channel estimation cycle.

17. The communication receiver of claim 15, wherein the channel equalizer retrieves at least one of the training sequence portion and the data portion from the buffer during a channel equalizer cycle.

18. The communication receiver of claim 14, wherein the plurality of channel estimation cycles comprising a plurality of regions; and
wherein the channel estimator performs region-dependent error handling using repeated adaptation on at least one of the training sequence portion and the data portion within the system identification mode.

19. The communication receiver of claim 18, wherein one region within the plurality of regions comprises a number of iterations, a step size, and a threshold.

20. The communication receiver of claim 19, wherein at least one additional region within the plurality of regions comprises the number of iterations and a step size smaller than the step size of the one region.

21. The communication receiver of claim 14, wherein one region within the plurality of regions comprises a number of iterations, a step size, and a threshold.

22. The communication receiver of claim 21, wherein at least one additional region within the plurality of regions comprises the number of iterations and a step size smaller than the step size of the one region.

23. The communication receiver of claim 14, wherein the communication receiver receives, as input, 'a priori' information that corresponds to the characteristic of a communication channel, the signal being transmitted to the communication receiver via the communication channel.

24. The communication receiver of claim 23, wherein the channel estimator employs the 'a priori' information that corresponds to the characteristic of the communication channel to modify an end condition of at least one of the channel estimation cycles within the system identification mode.

25. The communication receiver of claim 23, wherein the channel equalizer employs the 'a priori' information that corresponds to the characteristic of the communication channel to modify an end condition of at least one of the channel equalizer cycles within the channel equalizer mode.

26. The communication receiver of claim 14, wherein the channel equalizer block comprises a decision feedback equalizer.

27. The communication receiver of claim 14, wherein the communication receiver comprises a receive block that is contained within a transceiver.

28. The communication receiver of claim 14, wherein the communication receiver is contained within at least one of a base station receiver, a mobile receiver, a tower receiver, and a high definition television set top box.

29. A communication receiver that receives a signal that includes a training sequence portion and a data portion, the communication receiver comprising:
a channel estimator;
a channel equalizer that is operable to calculate a plurality of channel equalizer tap coefficients, the plurality of channel equalizer tap coefficients being used to equalize for any communication channel-induced changes within the received signal, the channel equalizer operable to be selectively communicatively coupled to the channel estimator; and
wherein the channel estimator employs repeated adaptation on the received signal to estimate a characteristic of a communication channel and then provides the channel estimate to the channel equalizer, the channel equalizer then performing direct calculation of the plurality of equalizer tap coefficients based on the channel estimate provided by the channel estimator, wherein the channel estimator performs region-dependent error handling using repeated adaptation on at least one of the training sequence portion and the data portion; and
the repeated adaptation performed by the channel estimator includes a plurality of channel estimation cycles having a plurality of regions.

30. The communication receiver of claim 29, further comprising a buffer; and
wherein the communication receiver stores at least one of the training sequence portion and the data portion in the buffer.

31. The communication receiver of claim 30, wherein the channel estimator retrieves at least one of the training sequence portion and the data portion from the buffer during a channel estimation cycle.

32. The communication receiver of claim 29, wherein one region within the plurality of regions comprises a number of iterations, a step size, and a threshold.

33. The communication receiver of claim 32, wherein at least one additional region within the plurality of regions comprises the number of iterations and a step size smaller than the step size of the one region.

34. The communication receiver of claim 29, wherein the communication receiver receives, as input, 'a priori' information that corresponds to the characteristic of a communication channel, the signal being transmitted to the communication receiver via the communication channel.

35. The communication receiver of claim 34, wherein the channel estimator employs the 'a priori' information that corresponds to the characteristic of the communication channel to modify an end condition of at least one of the channel estimation cycles.

36. The communication receiver of claim 29, wherein the channel equalizer block comprises a decision feedback equalizer.

37. The communication receiver of claim 29, wherein the communication receiver comprises a receive block that is contained within a transceiver.

38. The communication receiver of claim 29, wherein the communication receiver is contained within at least one of a base station receiver, a mobile receiver, a tower receiver, and a high definition television set top box.

39. A repeated adaptation communication receiver method, comprising:
   receiving a signal that is transmitted via a communication channel, the received signal includes a training sequence portion and a data portion;
   selectively estimating a characteristic of a communication channel using repeated adaptation on at least one of the training sequence portion and the data portion, the repeated adaptation of the selective channel estimation being performed using a plurality of channel estimation cycles having a plurality of regions, wherein estimating the characteristic of the channel communication channel includes performing region-dependent error handling using repeated adaptation on the training sequence portion and the data portion; and
   selectively calculating a plurality of channel equalizer tap coefficients using repeated adaptation on at least one of the training sequence portion and the data portion, the plurality of channel equalizer tap coefficients being used to equalize for any communication channel-induced changes within the received signal.

40. The method of claim 39, further comprising:
   initially estimating the characteristic of the communication channel using the repeated adaptation on the at least one of the training sequence portion and the data portion; and
   subsequently employing the estimated characteristic of the communication channel to perform direct calculation of the plurality of equalizer tap coefficients.

41. The method of claim 39, further comprising receiving, as input, 'a priori' information that corresponds to the characteristic of the communication channel.

42. The method of claim 41, wherein the selective estimating of the characteristic of the communication channel comprises employing the 'priori' information that corresponds to the characteristic of the communication channel to modify an end condition of at least one of the channel estimation cycles.

43. The method of claim 41, wherein the selectively calculating of the plurality of channel equalizer tap coefficients comprises employing the 'a priori' information that corresponds to the characteristic of the communication channel to modify an end condition of at least one of the channel equalizer cycles.

44. The method of claim 39, wherein the selectively calculating a plurality of channel equalizer tap coefficients is performed using a decision feedback equalizer.

45. The method of claim 39, further comprising:
   storing the at least one of the training sequence portion and the data portion in a buffer; and
   retrieving the at least one of the training sequence portion and the data portion from the buffer during at least one of a channel estimation cycle and a channel equalizer cycle.

46. The method of claim 39, wherein one region within the plurality of regions comprises a number of iterations, a step size, and a threshold.

47. The method of claim 46, wherein at least one additional region within the plurality of regions comprises the number of iterations and a step size smaller than the step size of the one region.

48. The method of claim 39, wherein the plurality of channel equalizer cycles comprising a plurality of regions; and
   wherein the selectively calculating of the plurality of channel equalizer tap coefficients comprises region-dependent error handling using repeated adaptation on the training sequence portion and the data portion.

49. The method of claim 48, wherein one region within the plurality of regions comprises a number of iterations, a step size, and a threshold.

50. The method of claim 49, wherein at least one additional region within the plurality of regions comprises the number of iterations and a step size smaller than the step size of the one region.

51. The method of claim 39, wherein the method is performed in a receive block, the receive block is contained within a transceiver.

52. The method of claim 39, wherein the method is performed in at least one of a base station receiver, a mobile receiver, a tower receiver, and a high definition television set top box.

53. A repeated adaptation communication receiver method, comprising:
   receiving a signal that is transmitted via a communication channel, the received signal includes a training sequence portion and a data portion;
   initially estimating a characteristic of a communication channel using repeated adaptation on the training sequence portion and the data portion, the repeated adaptation of the selective channel estimation being performed using a plurality of channel estimation cycles that include a plurality of regions, wherein estimating the characteristic of the communication channel includes performing region-dependent error handling using repeated adaptation on the training sequence portion and the data portion; and
   subsequently employing the estimated characteristic of the communication channel to perform direct calculation of a plurality of equalizer tap coefficients, the plurality of equalizer tap coefficients being used to equalize any communication channel-induced changes within the received signal.

54. The method of claim 53, further comprising receiving, as input, 'a priori' information that corresponds to the characteristic of the communication channel.

55. The method of claim 54, wherein the selective estimating of the characteristic of the communication channel comprises employing the 'a priori' information that corresponds to the characteristic of the communication channel to modify an end condition of at least one of the channel estimation cycles.

56. The method of claim 53, wherein direct calculation of the plurality of equalizer tap coefficients being calculated using a decision feedback equalizer.

57. The method of claim 53, further comprising:
storing at least one of the training sequence portion and the data portion in a buffer; and
retrieving at least one of the training sequence portion and the data portion from the buffer during a channel estimation cycle.

58. The method of claim 53, wherein one region within the plurality of regions comprises a number of iterations, a step size, and a threshold.

59. The method of claim 58, wherein at least one additional region within the plurality of regions comprises the number of iterations and a step size smaller than the step size of the one region.

60. The method of claim 53, wherein the method is performed in a receive block, the receive block is contained within a transceiver.

61. The method of claim 53, wherein the method is performed in at least one of a base station receiver, a mobile receiver, a tower receiver, and a high definition television set top box.

* * * * *